US008533196B2

(12) United States Patent
Miyamoto et al.

(10) Patent No.: US 8,533,196 B2
(45) Date of Patent: Sep. 10, 2013

(54) INFORMATION PROCESSING DEVICE, PROCESSING METHOD, COMPUTER PROGRAM, AND INTEGRATED CIRCUIT

(75) Inventors: Shingo Miyamoto, Hyogo (JP); Kouji Miura, Osaka (JP); Shunji Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/499,740

(22) PCT Filed: Jul. 6, 2011

(86) PCT No.: PCT/JP2011/003865
§ 371 (c)(1),
(2), (4) Date: Apr. 2, 2012

(87) PCT Pub. No.: WO2012/017599
PCT Pub. Date: Feb. 9, 2012

(65) Prior Publication Data
US 2012/0197923 A1    Aug. 2, 2012

(30) Foreign Application Priority Data

Aug. 3, 2010 (JP) ................................. 2010-174503

(51) Int. Cl.
*G06F 17/30* (2006.01)
(52) U.S. Cl.
USPC ........................................................ 707/738
(58) Field of Classification Search
USPC ................. 707/2, 3, 738; 709/203; 455/418; 348/231.3
See application file for complete search history.

(56) References Cited

U.S. PATENT DOCUMENTS

| 6,813,395 | B1 | 11/2004 | Kinjo |
| 2004/0213553 | A1 | 10/2004 | Nagahashi |
| 2004/0236791 | A1 | 11/2004 | Kinjo |
| 2005/0278379 | A1 | 12/2005 | Nakazawa |
| 2006/0044635 | A1 | 3/2006 | Suzuki et al. |
| 2009/0023432 | A1* | 1/2009 | MacInnis et al. ............. 455/418 |
| 2010/0141795 | A1* | 6/2010 | Kim et al. ................. 348/231.3 |
| 2011/0145327 | A1* | 6/2011 | Stewart ........................ 709/203 |

FOREIGN PATENT DOCUMENTS

| JP | 2001-84274 | 3/2001 |
| JP | 2004-234228 | 8/2004 |
| JP | 2005-275847 | 10/2005 |

(Continued)

OTHER PUBLICATIONS

International Search Report issued Sep. 20, 2011 in corresponding International Application No. PCT/JP2011/003865.

*Primary Examiner* — Etienne Leroux
(74) *Attorney, Agent, or Firm* — Wenderoth, Lind & Ponack, L.L.P.

(57) ABSTRACT

An information processing device that attaches common accompanying data to a content group composed of contents. The information processing device acquires the contents, acquires one or more characteristics of each acquired content and searches among reference data items in order to acquire one or more reference data items that each include any of the one or more characteristics, each reference data item having attached thereto at least one attribute used for identifying the reference data item, the reference data items being data other than the contents. The information processing device then specifies, among the attributes attached to the acquired one or more reference data items, an attribute that also pertains to the contents, uses the specified attribute as an attribute for identifying each of the contents, and attaches the specified attribute to each of the contents.

10 Claims, 24 Drawing Sheets

(56) References Cited

FOREIGN PATENT DOCUMENTS

| JP | 2005-352782 | 12/2005 |
| JP | 2006-72614 | 3/2006 |
| JP | 2006-99268 | 4/2006 |
| JP | 2008-269411 | 11/2008 |
| JP | 2010-9337 | 1/2010 |

* cited by examiner

FIG. 17
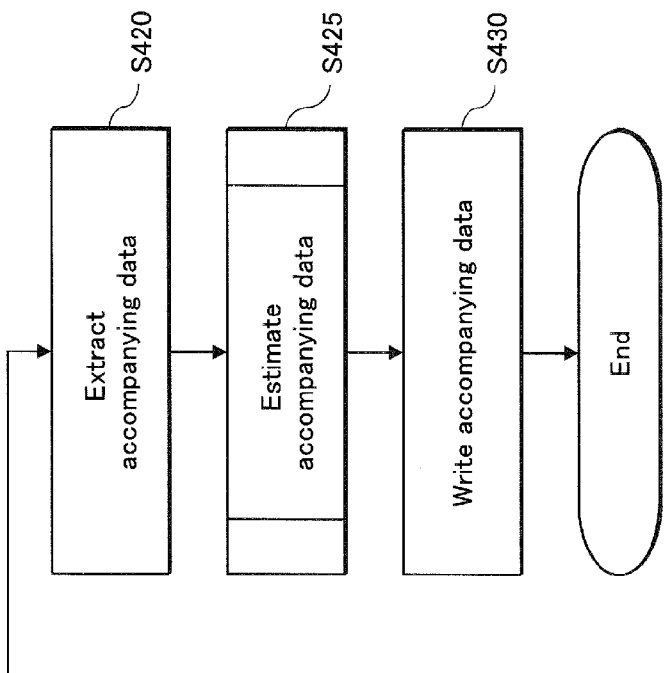
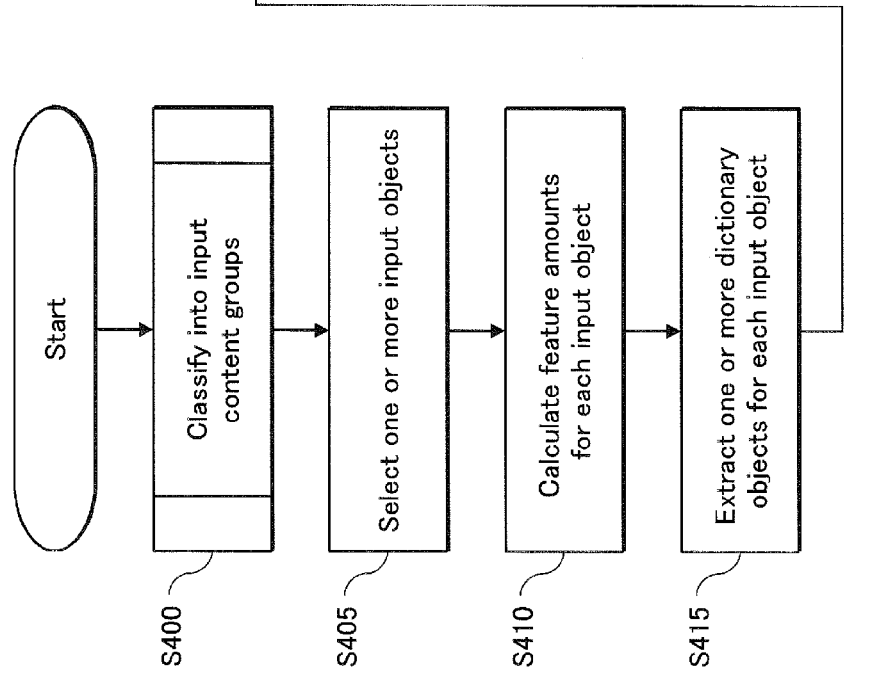

FIG. 22
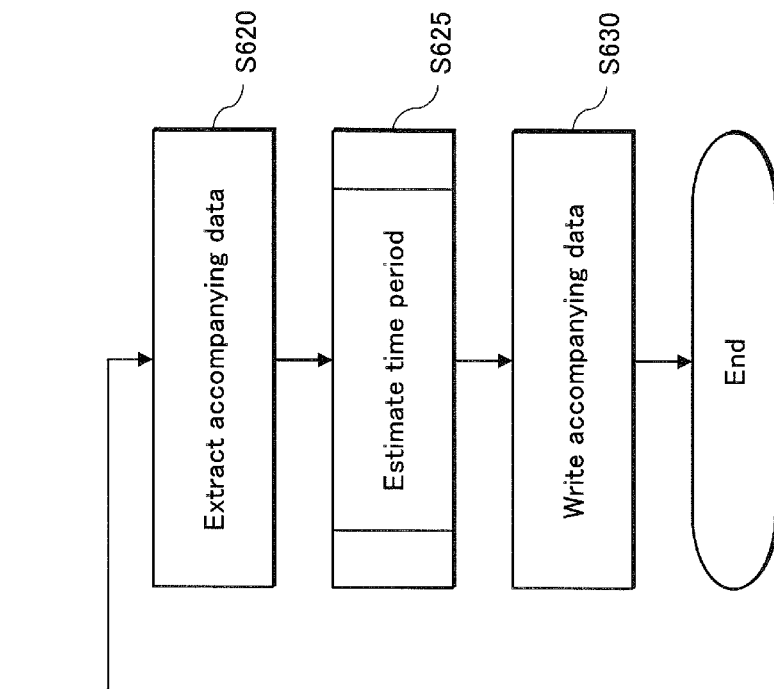
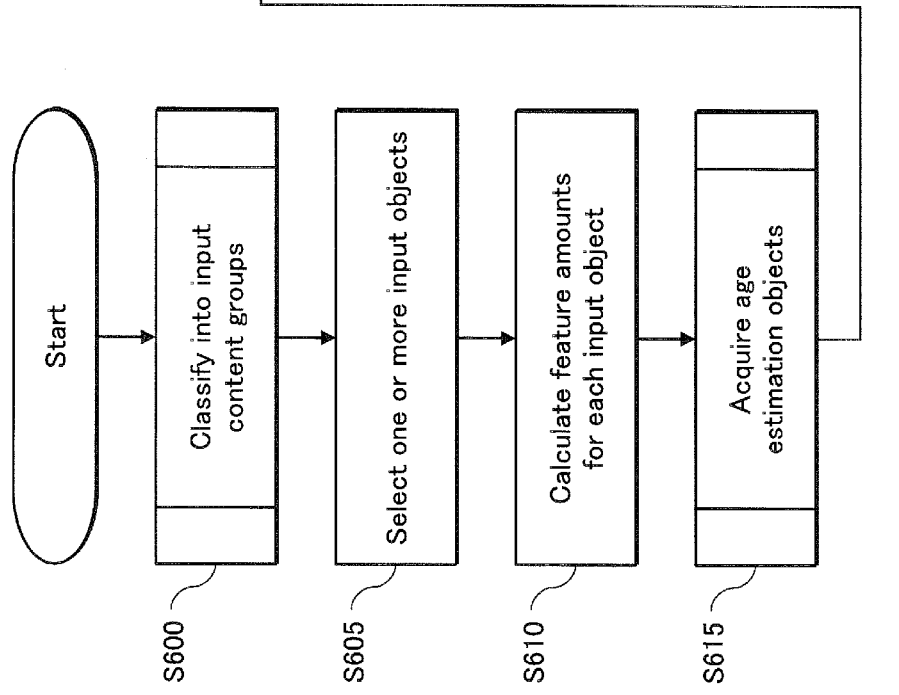

INFORMATION PROCESSING DEVICE, PROCESSING METHOD, COMPUTER PROGRAM, AND INTEGRATED CIRCUIT

TECHNICAL FIELD

The present invention relates to technology for attaching, to a content, information on characteristics of the content.

BACKGROUND ART

In recent years, thanks to the spread of digital still cameras, digital video cameras, and personal computers (PCs), individual users can now store a vast amount of digital content, such as still images and video.

Furthermore, technology such as film scanning has made it easy to digitalize analog content, such as photographs taken with a silver salt camera or video taken with an 8 mm camera, and store the digitalized content in a PC or the like.

The need thus arises for easy management of a large quantity of content stored in a location such as a PC. One possibility is for management based on the shooting date of the content or the shooting location. In the case of content captured with a digital still camera or a digital video camera, accompanying data such as the shooting date or shooting location can be acquired from Exchangeable Image File Format (Exif) data attached to the content. Information such as the shooting date or shooting location cannot be acquired, however, from digitalized content originally captured with a silver salt camera or an 8 mm camera. Furthermore, some digital still cameras and digital video cameras with low functionality do not have a Global Positioning System (GPS) function. In this case, accompanying data on the shooting location cannot be acquired.

To address this problem, Patent Literature 1 discloses technology to analyze a content and estimate the accompanying data that should be attached to the content. In Patent Literature 1, a plurality of similar registered images are extracted, the similar registered images having image feature amounts similar to the image feature amounts for an input image (content). Shared items are then extracted from among accompanying information for the plurality of similar registered images. If a shared item satisfies a predetermined condition, the shared item is set as accompanying data for the input image.

CITATION LIST

Patent Literature

Patent Literature 1: Japanese Patent Application Publication No. 2005-275847

SUMMARY OF INVENTION

Technical Problem

With the technology disclosed in Patent Literature 1, however, the accompanying data to be attached to contents is estimated separately for each content, thus making it difficult to attach the same accompanying data to a plurality of related contents. For example, a user may travel to a certain region and consider the trip an event, managing a plurality of contents captured in that region by attaching accompanying data indicating the event. With the technology in Patent Literature 1, each of the contents captured at tourist attractions in the region have attached thereto, as accompanying data, information indicating the tourist attraction at which the content was captured. It is thus not possible to attach shared accompanying data, which treats the trip as an event, to the plurality of contents captured during the trip.

In light of the above problems, it is an object of the present invention to provide an information processing device, a processing method, a computer program, and an integrated circuit that attach shared accompanying data to a plurality of contents.

Solution to Problem

In order to achieve the above object, the present invention is an information processing device comprising: a first acquisition unit operable to acquire a plurality of contents; a second acquisition unit operable to acquire one or more characteristics of each acquired content and to search among a plurality of reference data items in order to acquire one or more reference data items that each include any of the one or more characteristics, each reference data item having attached thereto at least one attribute used for identifying the reference data item, the reference data items being data other than the plurality of contents; a specification unit operable to specify, among the attributes attached to the acquired one or more reference data items, an attribute that also pertains to the plurality of contents, the specified attribute being used for identifying each of the plurality of contents; and an attachment unit operable to attach the specified attribute to each of the plurality of contents.

Advantageous Effects of Invention

With the above structure, the information processing device uses the attributes attached to the reference data items to specify a shared attribute that is to be used to identify the plurality of contents and attaches the specified attribute to each of the plurality of contents. Therefore, the information processing device can attach a shared attribute to a content group composed of a plurality of contents. By attaching the shared attribute to each of the plurality of contents, the information processing device can, for example, search the content group using the attached attribute as a keyword for searching.

BRIEF DESCRIPTION OF DRAWINGS

FIG. 12 is a block diagram showing the structure of an information processing device 1000a.

FIG. 17 is a flowchart outlining processing by the information processing device 2000.

FIG. 22 is a flowchart outlining processing by the information processing device 3000.

DESCRIPTION OF EMBODIMENTS

The following describes Embodiments of the present invention with reference to the Figures.

1. Embodiment 1

Figure 1:
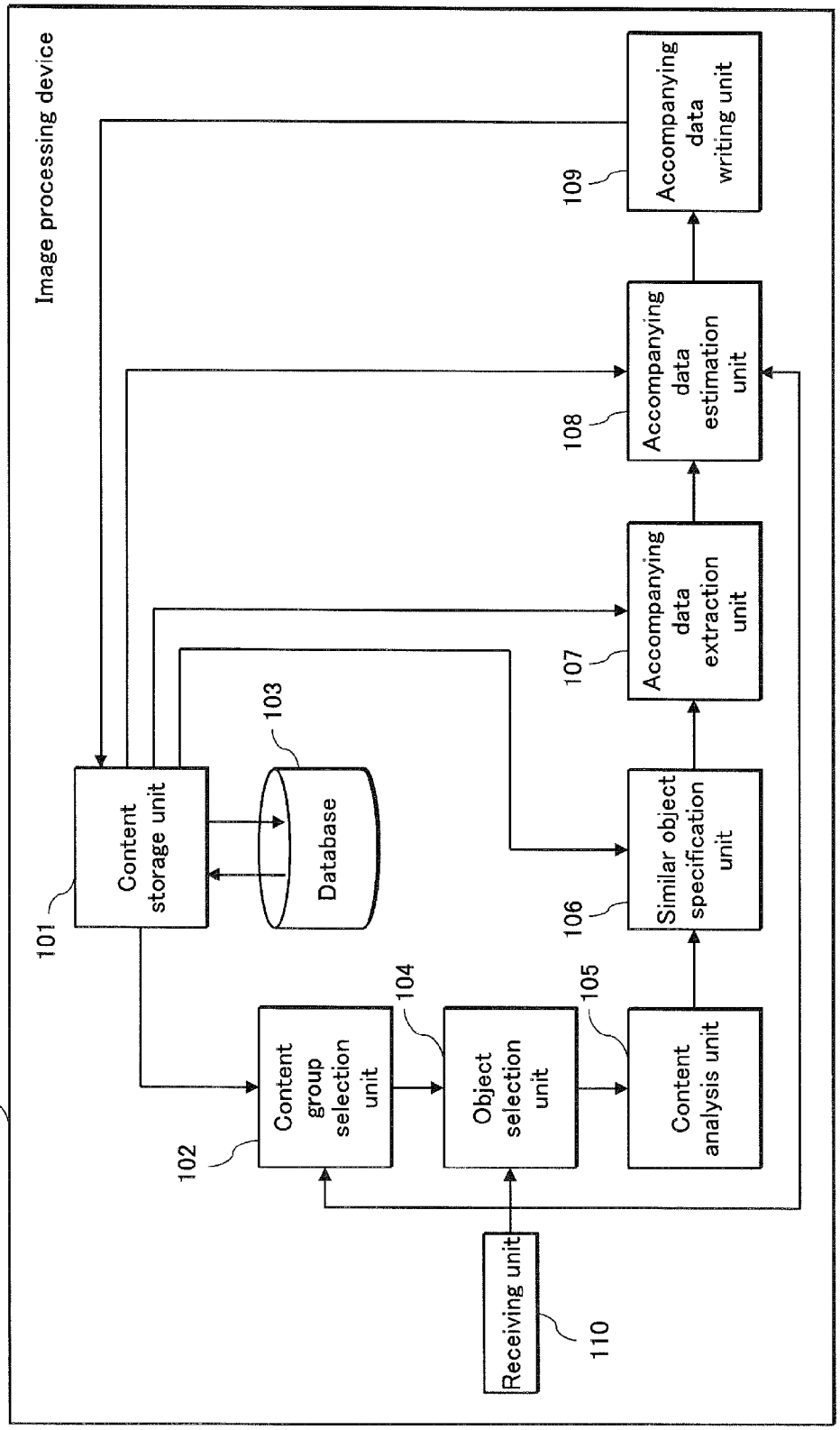
FIG. 1 is a block diagram showing the structure of an information processing device 10.

The following describes an information processing device 10 in Embodiment 1 of the present invention.
1.1 Structure
As shown in FIG. 1, the information processing device 10 includes a content storage unit 101, a content group selection unit 102, a database 103, an object selection unit 104, a content analysis unit 105, a similar object specification unit 106, an accompanying data extraction unit 107, an accompanying data estimation unit 108, an accompanying data writing unit 109, and a receiving unit 110.
(1) Database 103
The database 103 is located in the information processing device 10. The database 103 stores digital content data managed by the content storage unit 101 and accompanying data for the digital content data, as well as feature amounts of objects included in the digital content data. Furthermore, the database 103 also stores digital content data that does not have any other information attached thereto.

Figure 2:
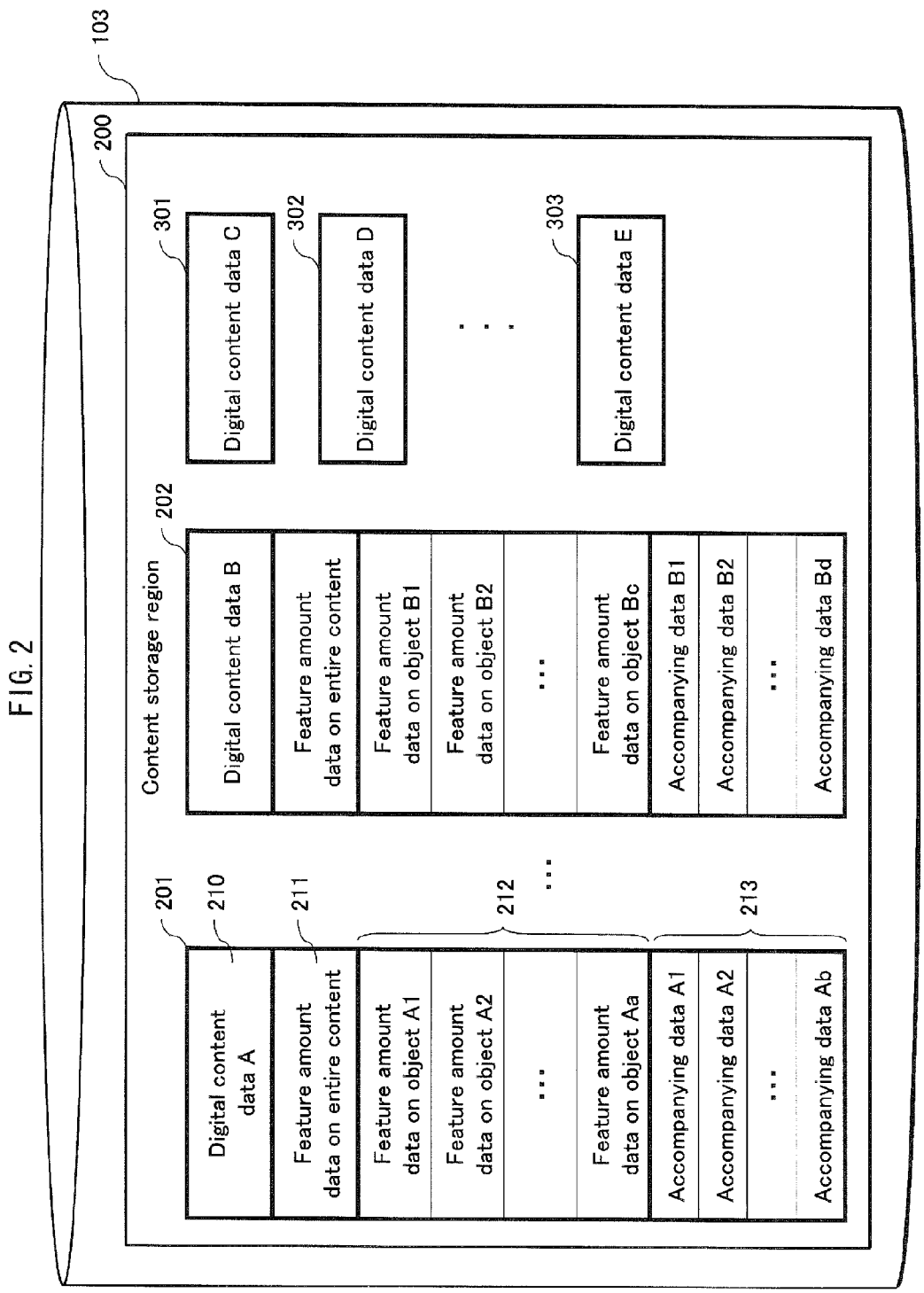
FIG. 2 shows an example of the data structure of a database 103.

FIG. 2 shows an example of the internal structure of the database 103. As shown in FIG. 2, the database 103 stores digit content 201, . . . , 202, and 301, 302, . . . , 303 in a content storage area.

In this context, a digital content refers to information stored in a digital format. For example, a digital content may be a still image photographed with a digital still camera or a video filmed with a digital video camera.

The digital contents 201, . . . , 202 include, for each digital content, feature amount data on the entire content, feature amount data on objects included in the digital content, and accompanying data for the digital content. For example, the digital content 201 is composed of digital content data A210, which is image data; feature amount data 211 on the entire content; a feature amount data set 212 composed of feature amount data for objects A1, A2, . . . , Aa; and an accompanying data set 213 composed of accompanying data A1, A2, . . . , Ab. The objects A1, A2, . . . , Aa are objects detected within the digital content data A210. An object refers to a person, thing, or landscape included in one image of a digital content, or any region extracted from an image. Feature amounts refer to the hue or brightness of an image in a digital content, constituent elements of the image such as contours, and a variety of characteristics calculated based on the constituent elements of the image.

The accompanying data A1, A2, . . . , Ab is attribute information for a digital content and is attached to the digital content. For example, accompanying data may be Exif data attached to an image photographed by a digital still camera, or metadata such as a keyword or a tag attached to a digital content at a digital content upload site. The accompanying data A1, A2, . . . , Ab is also used to identify the digital content. For example, if accompanying data indicating the date of creation is attached to each digital content, such accompanying data is used to identify a digital content created on a specific date.

The digital contents C 301, D 302, . . . , E 303 are contents not yet associated with feature amounts of the entire content, feature amounts of objects, and accompanying data.

The information processing device 10 uses the digital contents 201, . . . , 202 to identify the accompanying data that is to be associated with the contents not yet associated with feature amounts of the entire content, feature amounts of objects, and accompanying data. Hereinafter, contents not yet associated with feature amounts of the entire content, feature amounts of objects, and accompanying data are referred to as contents targeted for estimation. On the other hand, digital contents that have been associated with feature amounts of the entire content, feature amounts of objects, and accompanying data are referred to as stored contents.
(2) Content Storage Unit 101
The content storage unit 101 stores, in the database 103, contents managed by the information processing device 10, such as digital contents associated with accompanying data and the like (the digital contents 201, . . . , 202 in FIG. 2) and contents targeted for estimation (the digital contents 301, 302, . . . , 303 in FIG. 2). The content storage unit 101 manages the contents stored in the database 103.
(3) Content Group Selection Unit 102
The content group selection unit 102 extracts a plurality of contents targeted for estimation from among the digital contents managed by the content storage unit 101. Based on user operation, the content group selection unit 102 classifies each of the extracted contents targeted for estimation into one or more input content groups.

An input content group refers to a collection of one or more contents targeted for estimation. One method of classification is to group together a plurality of contents targeted for estimation based on indices such as date, event, or location, as indicated by user operation. Specifically, contents may be classified as belonging to a predetermined time frame starting from a certain date and time, or as being within a predetermined range from a certain position.

(4) Object Selection Unit 104

The object selection unit 104 selects one or more objects as input objects for each content targeted for estimation included in the input content group.

Specifically, the object selection unit 104 receives a designation via the receiving unit 110, the designation being provided by user operation, of a region (such as a rectangular region) that includes an object in the content targeted for estimation. Upon receiving the designation, the object selection unit 104 selects the designated region and object. The selected object is hereinafter referred to as an input object.

(5) Content Analysis Unit 105

The content analysis unit 105 analyzes the one or more input objects selected by the object selection unit 104 and calculates feature amounts for each input object.

Note that methods of calculating feature amounts are well-known technology, and therefore a description of such methods is omitted here. For example, such technology is disclosed in Japanese Patent Application Publication No. 2001-84274 and Japanese Patent Application Publication No. 2005-275847.

(6) Similar Object Specification Unit 106

For each input object, the similar object specification unit 106 extracts one or more of a plurality of objects that are included in digital contents other than the input content group, i.e. included in a plurality of stored contents (such objects hereinafter being referred to as "stored objects"), and that are similar to the input object (such objects hereinafter being referred to as "similar objects"). The similar object specification unit 106 extracts the one or more similar objects using the calculated feature amounts and the feature amounts associated with each of the stored objects.

(7) Accompanying Data Extraction Unit 107

For each of the similar objects extracted for each input object, the accompanying data extraction unit 107 extracts all of the accompanying data associated with the stored contents that include the similar object.

(8) Accompanying Data Estimation Unit 108

The accompanying data estimation unit 108 estimates the most appropriate accompanying data for each input content group based on the accompanying data extracted by the accompanying data extraction unit 107.

The method of estimating accompanying data is based on the number or type of accompanying data items for the similar contents used for estimation, or on whether the accompanying data is fixed or non-fixed. Fixed accompanying data refers to accompanying data having predetermined subject matter, such as Exif data used in images photographed by a digital still camera. Non-fixed accompanying data refers to accompanying data whose subject matter is not predetermined, such as a keyword or tag that is attached to an image at a digital content upload site.

Specifically, the accompanying data estimation unit 108 receives, via the receiving unit 110, a type of accompanying data to be used for estimation, as selected by user operation from among a plurality of accompanying data items. Upon receiving the type of accompanying data, the accompanying data estimation unit 108 uses accompanying data corresponding to the received type in order to estimate, for each input content group, one or more accompanying data items to be associated with all of the contents targeted for estimation in the input content group. The type of accompanying data is, for example, the creation date included in Exif data, Global Positioning System (GPS) information, or information distinguishing a keyword or tag included in metadata.

Specifically, the accompanying data estimation unit 108 extracts accompanying data that is shared by all of the input objects selected from the contents targeted for estimation in the input content group. The accompanying data estimation unit 108 then designates the extracted accompanying data as the accompanying data to be associated with each of the contents targeted for estimation. The accompanying data estimation unit 108 may create combinations of the extracted accompanying data in order to designate all of the extracted accompanying data as the accompanying data to be associated with each of the contents targeted for estimation. Note that a specific example of estimating accompanying data for the input content group is described below.

(9) Accompanying Data Writing Unit 109

The accompanying data writing unit 109 associates one or more accompanying data items estimated by the accompanying data estimation unit 108 for each input content group with all of the contents targeted for estimation in the corresponding input content group.

(10) Receiving Unit 110

The receiving unit 110 is, for example, a remote control, mouse, keyboard, or the like for a user to provide input to the information processing device 10.

The receiving unit 110 receives a variety of instructions via user operation.

For example, regarding a plurality of contents targeted for estimation that have been extracted, the receiving unit 110 receives instructions regarding the input content group to which each of the contents targeted for estimation belongs.

The receiving unit 110 also receives a designation of an object included in a content targeted for estimation.

Furthermore, the receiving unit 110 receives a type of accompanying data to be used by the accompanying data estimation unit 108.

1.2 Operations (1) Outline of Operations

Figure 3:
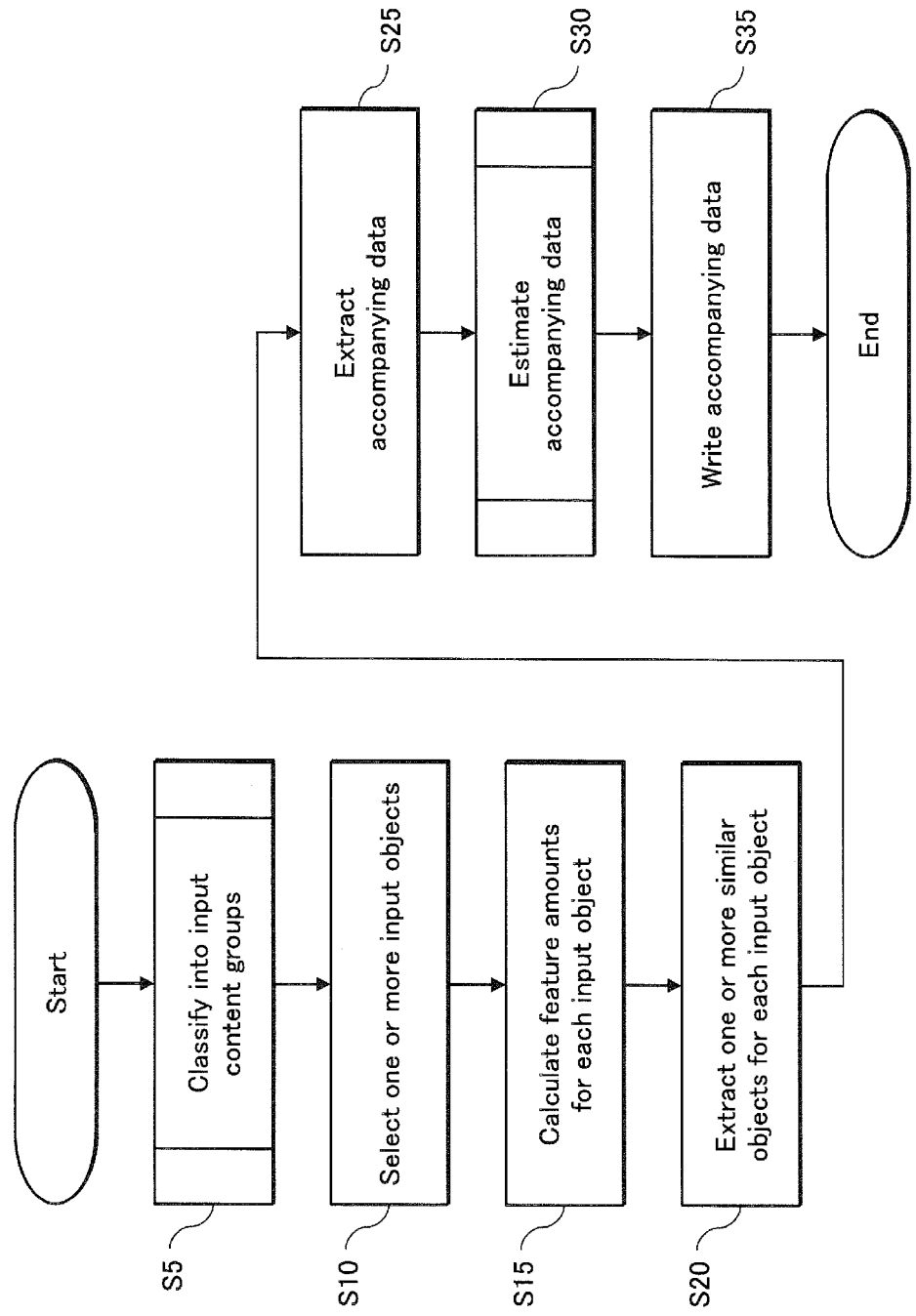
FIG. 3 is a flowchart outlining processing by the information processing device 10.

The following describes an outline of operations by the information processing device 10 to estimate accompanying data for an input content group with reference to the flowchart in FIG. 3.

The content group selection unit 102 classifies one or more contents targeted for estimation into one or more input content groups based on user operation (step S5).

The object selection unit 104 selects one or more input objects for each content targeted for estimation included in each input content group (step S10). Specifically, the object selection unit 104 receives a designation, provided by user operation, of a region (such as a rectangular region) that includes an object in the content targeted for estimation. Upon receiving the designation, the object selection unit 104 selects the designated region as an input object.

The content analysis unit 105 calculates feature amounts for each of the one or more input objects selected by the object selection unit 104 (step S15). Specifically, the content analysis unit 105 analyzes each of the one or more input objects selected in step S10 and calculates the feature amounts for the input object.

For each of the input objects extracted in step S10, the similar object specification unit 106 extracts one or more stored objects (similar objects) that are similar to the input object from among one or more stored objects included in one or more stored contents (step S20). The determination of whether a stored object is similar to an input object is made by comparing the feature amounts of an input object extracted in step S15 with the feature amounts of a stored object included in a stored content. It is then determined whether the two sets of feature amounts match, or if the difference is within an allowable range. When the feature amounts match or are within an allowable range, the two objects are determined to be similar. A predetermined value or a user-set value may be used as the allowable range.

For each of the one or more similar objects extracted in step S20, the accompanying data extraction unit 107 extracts accompanying data of the stored content that includes the similar object (step S25).

The accompanying data estimation unit 108 uses the accompanying data extracted in step S25 to estimate accompanying data for each input content group (step S30).

For each input content group, the accompanying data writing unit 109 records the accompanying data estimated in step S30 for all of the contents targeted for estimation included in the input content group (step S35).

(2) Classification

Figure 4:
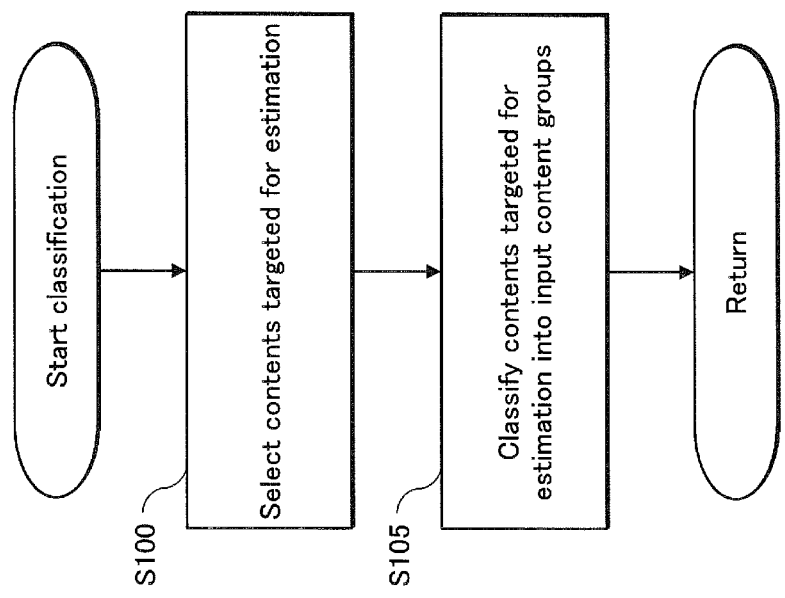
FIG. 4 is a flowchart of operations for classification by the information processing device 10.

The following describes the classification of step S5 in FIG. 3 in detail with reference to the flowchart in FIG. 4.

Based on user operation, the content group selection unit 102 selects contents targeted for estimation from among the digital contents stored in the database 103 (step S100).

Once contents targeted for estimation are selected in step S100, the content group selection unit 102 classifies the selected contents targeted for estimation into one or more input content groups (step S105).

(3) Estimation of Accompanying Data

Figure 5:
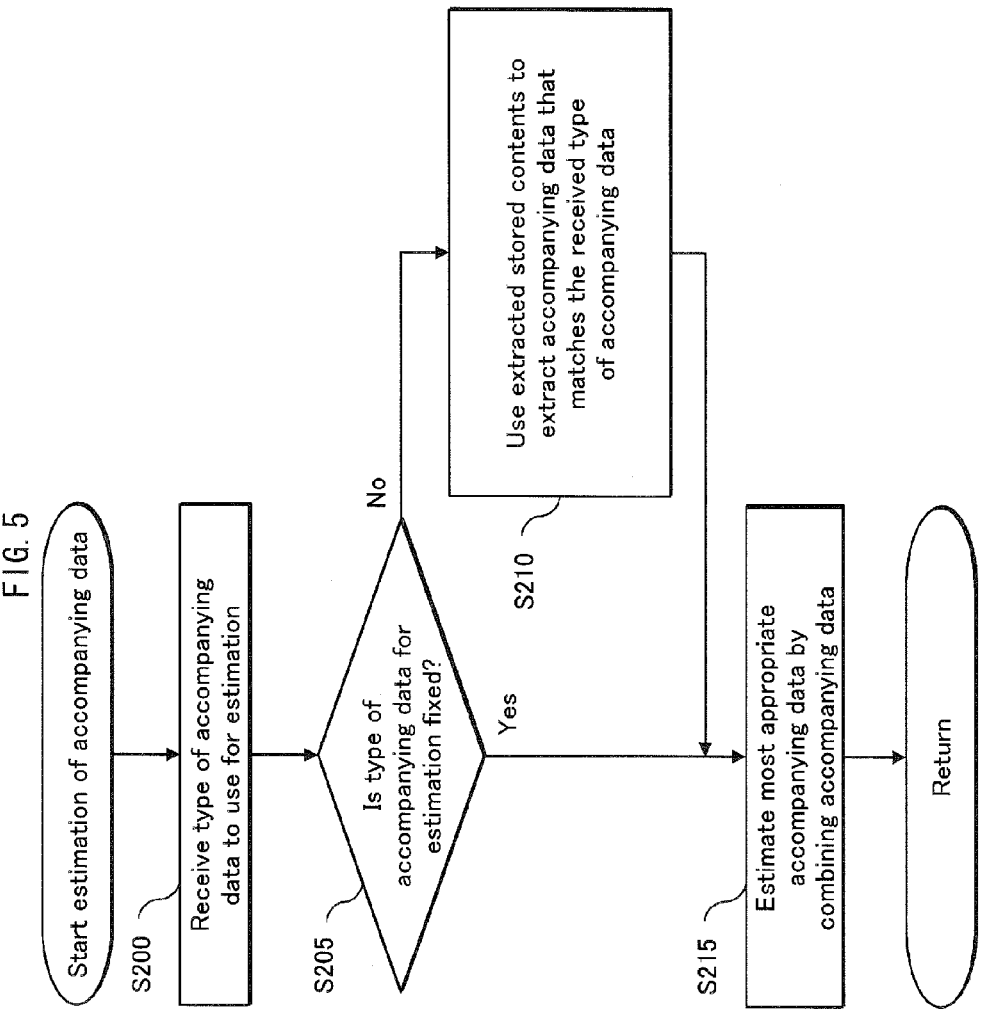
FIG. 5 is a flowchart of operations for estimation of accompanying data by the information processing device 10.

The following describes the estimation of accompanying data in step S30 of FIG. 3 in detail with reference to the flowchart in FIG. 5. Note that this estimation process is performed for each content targeted for estimation.

Via the receiving unit 110, the accompanying data estimation unit 108 receives a user indication of a type of accompanying data to use for estimation from among the accompanying data of stored contents extracted in step S25 of FIG. 3 (step S200).

The accompanying data estimation unit 108 determines whether the received type of accompanying data is fixed (step S205). Specifically, the accompanying data estimation unit 108 determines whether the received type of accompanying data is fixed based on the storage region, for a stored content, of accompanying data corresponding to the received type of accompanying data. This is because accompanying data and non-fixed accompanying data are stored in different regions.

If the type of accompanying data is not fixed, i.e. if the type of accompanying data is determined to be non-fixed (step S205: No), the accompanying data estimation unit 108 uses one or more stored contents for each input content group to extract accompanying data, or a fraction of accompanying data, that matches the received type of accompanying data (step S210).

After performing step S210, or when it has been determined that the received type of accompanying data is fixed (step S205: YES), the accompanying data estimation unit 108 selects or combines the fixed accompanying data, or the accompanying data or a fraction thereof extracted in step S210, in order to generate the accompanying data estimated as having the highest probability of being the most appropriate accompanying data for the input content group (step S215).

1.3 Specific Example

The following describes a specific example of estimating accompanying data for contents targeted for estimation.

(1) Specific Example 1

First, a specific example of using non-fixed accompanying data to estimate accompanying data regarding location is described.

Figure 6:
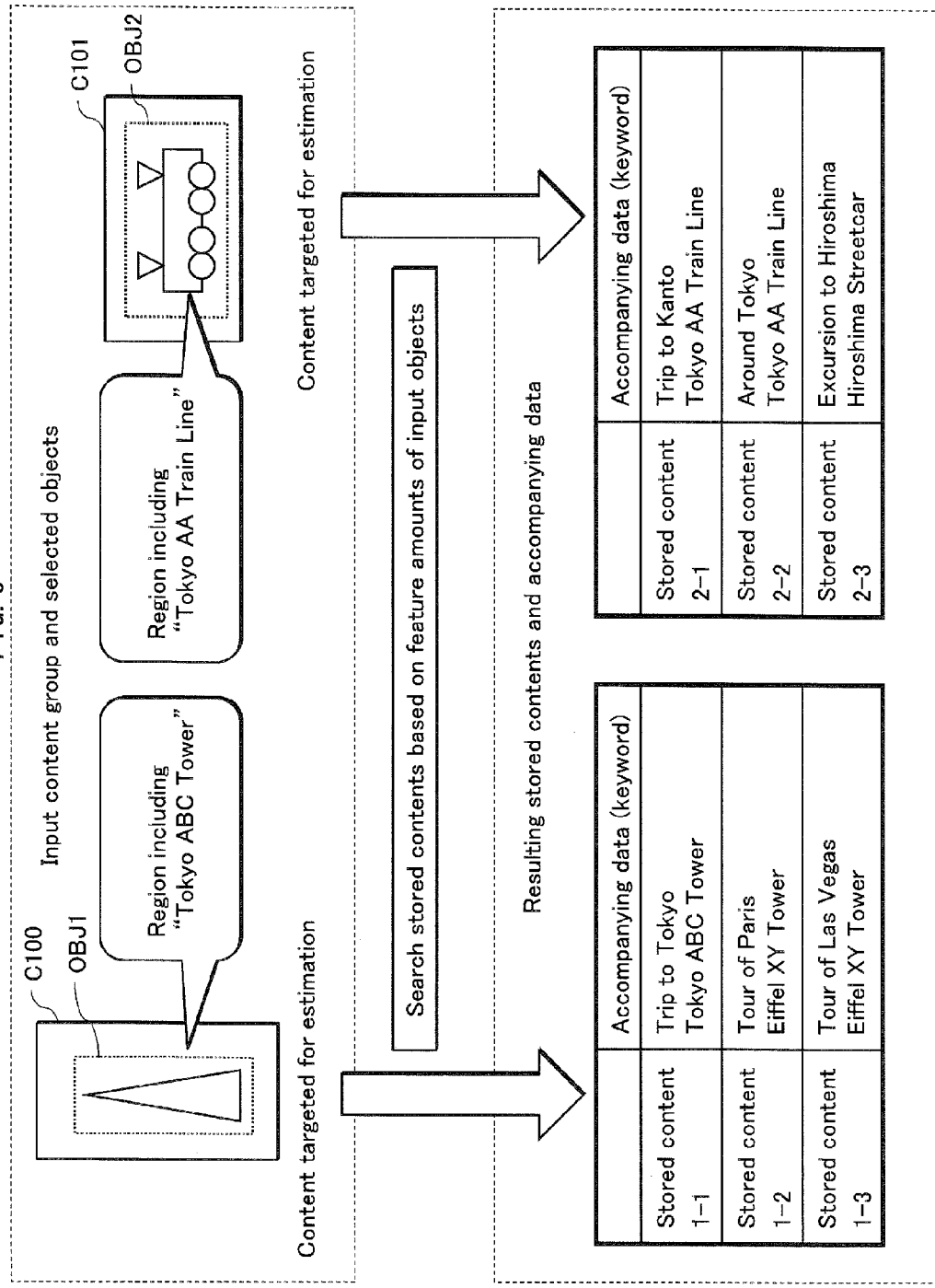
FIG. 6 shows a specific example of estimating accompanying data related to location using non-fixed accompanying data.

FIG. 6 shows extracted stored content and corresponding non-fixed accompanying data (keywords) for an input content group as a result of the information processing device 10 starting estimation of accompanying data related to location by performing processing from step S5 through step S25 in FIG. 3.

The following is a detailed description of the steps through which the accompanying data for the stored contents shown in FIG. 6 is obtained. In step S5 of FIG. 3, a photograph of "Tokyo ABC Tower" (contents targeted for estimation C100) and a photograph of a train on the "Tokyo AA Train Line" (contents targeted for estimation C101) are classified into an input content group.

Next, in step S10, a region including the "Tokyo ABC Tower" (hereinafter, OBJ1) and a region including the train on the "Tokyo AA Train Line" (hereinafter, OBJ2) are selected as input objects in the respective contents targeted for estimation C100 and C101.

Then, in step S15, the feature amounts of OBJ1 and OBJ2 are calculated. In step S20, three similar objects having feature amounts near the calculated feature amounts are extracted for each input object. Stored contents 1-1, 1-2, and 1-3 are extracted for OBJ1, whereas stored contents 2-1, 2-2, and 2-3 are extracted for OBJ2.

In step S25, the accompanying data shown in FIG. 6 is obtained from the stored contents 1-1 through 2-3, which include the extracted similar objects. In this state, accompanying data estimation (step S30) begins.

The accompanying data estimation unit 108 then performs step S200. Since the obtained accompanying data is of one type (keyword only), the accompanying data is used as is for estimation.

Next, the accompanying data estimation unit 108 performs step S205. The obtained accompanying data is a keyword, which is non-fixed. Processing thus proceeds to step S210. The accompanying data estimation unit 108 extracts accompanying data, or a fraction of accompanying data, that matches the type of accompanying data to be estimated, i.e. location. In this case, "Tokyo" is extracted as a keyword from "Trip to Tokyo" and "Tokyo ABC Tower" in the stored content 1-1, "Paris" is extracted from "Tour of Paris" in 1-2, and "Las Vegas" from "Tour of Las Vegas" in 1-3. "Kanto" is extracted as a keyword from "Trip to Kanto" in the stored content 2-1, "Tokyo" is extracted from "Around Tokyo" in 2-2, and "Hiroshima" from "Excursion to Hiroshima" in 2-3.

The accompanying data estimation unit 108 then performs step S215. When a fraction of the keywords have a shared portion, the shared portion is used as new accompanying data. In this case, the location "Tokyo", which is shared by the two stored contents 1-1 and 2-2, is used as accompanying data for the input content group.

Keywords that exhibit an inclusive relationship may be used as new accompanying data. In the present example, the location "Tokyo" is included in the broader concept "Kanto". Therefore, "Tokyo", "Kanto", or both locations may be used as accompanying data for the input content group. Note that since relationships of geographical inclusiveness are used, the information processing device 10 needs to be provided with a dictionary for supplemental knowledge regarding locations. For example, dictionary data may be stored in the database 103 and managed by the content storage unit 101.

On the other hand, the new accompanying data may be chosen as a keyword included exactly as is in accompanying data for the stored content for each input object. In such a case, the location "Tokyo", which is included in both the stored content 1-1 for OBJ1 and the stored content 2-2 for OBJ2, is used as the accompanying data for the input content group.

Furthermore, all of the keywords may simply be used as accompanying data. In this case, the locations "Tokyo", "Paris", "Las Vegas", "Kanto", and "Hiroshima" are all used as the accompanying data for the input content group.

Another method is to set the new accompanying data to be keywords whose locations are most concentrated over a geographical distance within a certain threshold. For example, if the threshold is 500 km or less, the two locations "Tokyo" and "Kanto" are within the threshold, whereas the other locations are not. Therefore, "Tokyo" and "Kanto" are used as the accompanying data for the input content group. In this case, "Tokyo" is a narrower concept than "Kanto". Therefore, it is possible to use only one of the locations "Tokyo" and "Kanto" as the accompanying data for the input content group. Note that the threshold may be a predetermined value or a user-set value.

Furthermore, the number of times the same keyword, or equivalent keywords, occurs within a plurality of keywords may be acquired. When the acquired number of occurrences is at least a certain value, the keyword(s) may be used as accompanying data. Equivalent keywords are, for example, two keywords for which one is a broader concept and the other a narrower concept.

(2) Specific Example 2

Next, a specific example of using fixed accompanying data to estimate accompanying data regarding location is described.

Figure 7:
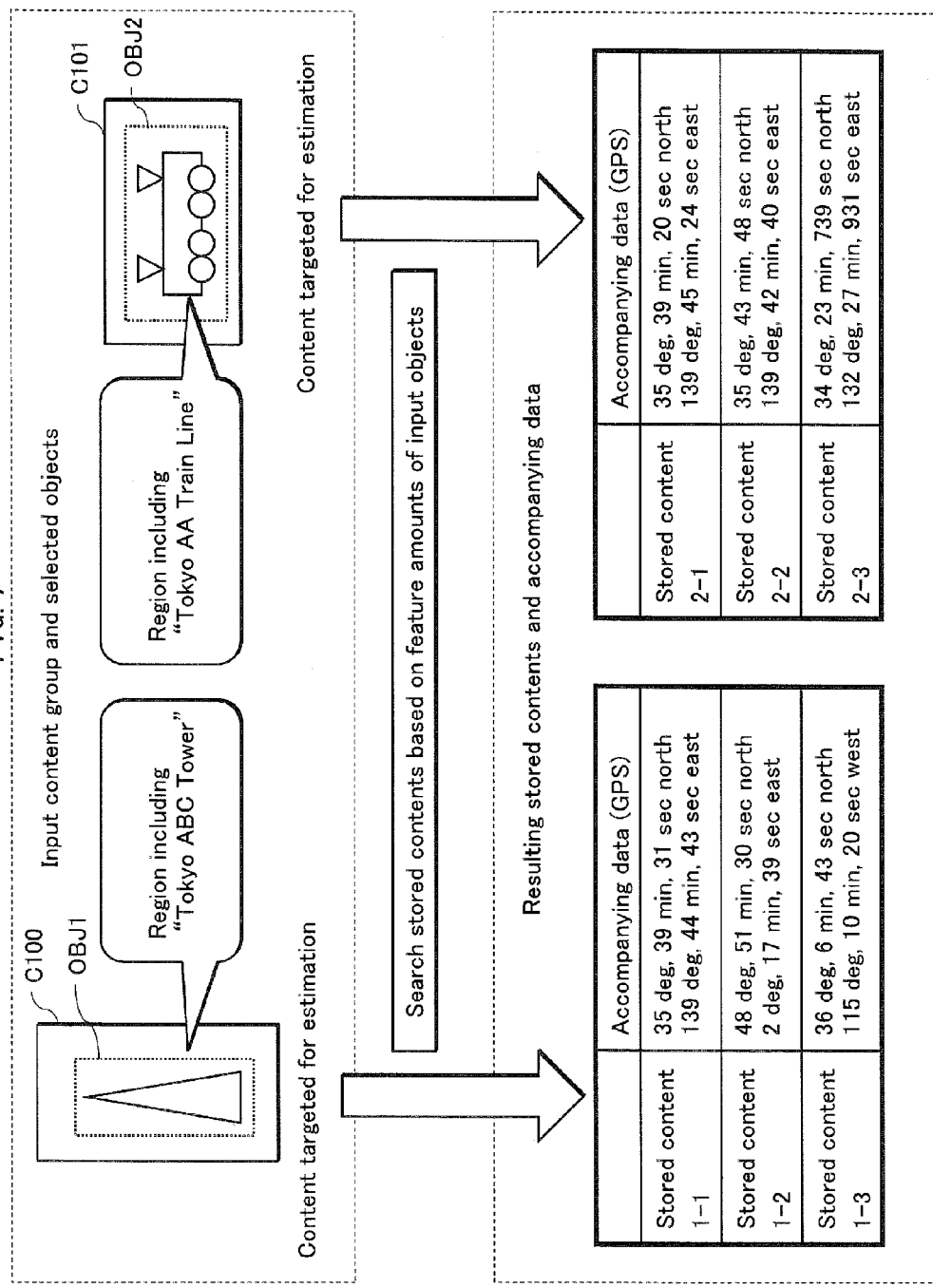
FIG. 7 shows a specific example of estimating accompanying data related to location using fixed accompanying data.

FIG. 7 shows extracted stored content and corresponding fixed accompanying data for an input content group as a result of the information processing device 10 starting estimation of accompanying data related to location by performing processing from step S5 through step S25 in FIG. 3.

Note that operations from step S5 through step S25 are similar to the operations in Specific Example 1. A description thereof is thus omitted. In this state, accompanying data estimation (step S30) begins.

The accompanying data estimation unit 108 then performs step S200. Since the obtained accompanying data is of one type, the accompanying data is used as is for estimation.

Next, the accompanying data estimation unit 108 performs step S205. The obtained accompanying data is fixed. Processing thus proceeds to step S215.

One method is to simply use all of the extracted accompanying data as the accompanying data for the input content group. In this case, in step S215, the accompanying data estimation unit 108 simply uses six GPS positions as accompanying data. Another method is to consider the six GPS positions as indicating a range rather than points. For example, GPS positions in a range of latitudes "from 34 degrees, 23 minutes, 739 seconds north to 48 degrees, 51 minutes, 30 seconds north" and longitudes "from 115 degrees, 10 minutes, 20 seconds west to 139 degrees, 45 minutes, 24 seconds east, traversing 0 degrees east" may be used as the accompanying data for the input content group.

Yet another method is to set the new accompanying data to be accompanying data indicating locations that are most concentrated over a geographical distance within a certain threshold. For example, if the threshold is 500 km or less, three GPS positions are used as the new accompanying data: "35 degrees, 39 minutes, 31 seconds north, 139 degrees, 44 minutes, 43 seconds east", "35 degrees, 39 minutes, 20 seconds north, 139 degrees, 45 minutes, 24 seconds east", and "35 degrees, 43 minutes, 48 seconds north, 139 degrees, 42 minutes, 40 seconds east". Still another method is to consider these three GPS positions as indicating a range rather than points. In this case, a range of latitudes "from 35 degrees, 39 minutes, 20 seconds north to 35 degrees, 43 minutes, 48 seconds north" and longitudes "from 139 degrees, 42 minutes, 40 seconds east to 139 degrees, 45 minutes, 24 seconds east" is used as the accompanying data for the input content group.

Furthermore, a GPS position may be converted into a city name and used as the accompanying data for the input content group in the same way as described above for estimating accompanying data related to location from non-fixed accompanying data of stored contents. Note that in order to convert GPS positions to city names in this way, the information processing device 10 needs to be provided with a dictionary for supplemental knowledge regarding the relationship between locations and GPS positions. For example, dictionary data may be stored in the database 103 and managed by the content storage unit 101.

(3) Specific Example 3

Next, a specific example of estimating accompanying data related to a time period from fixed accompanying data is described.

Figure 8:
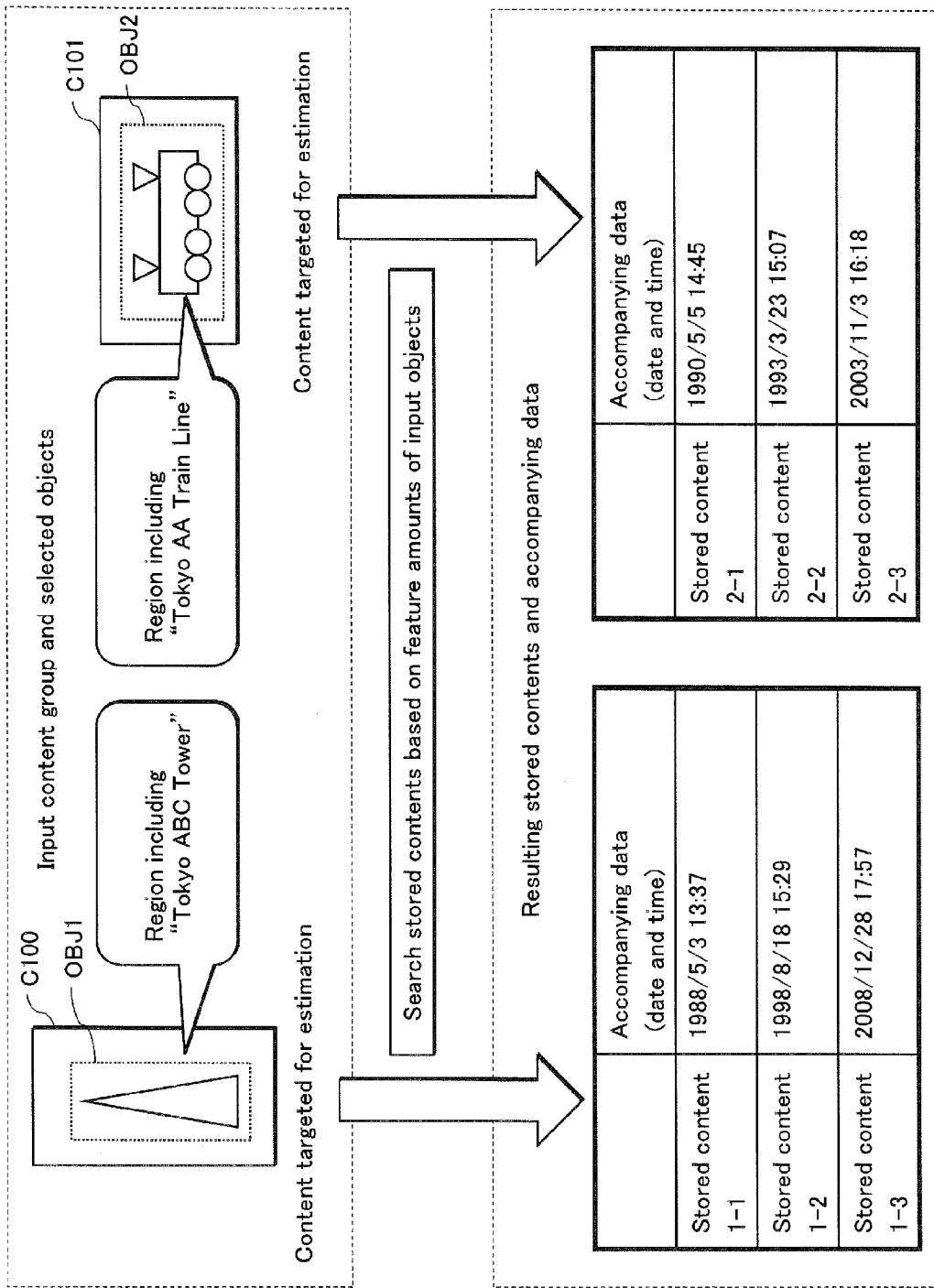
FIG. 8 shows a specific example of estimating accompanying data related to time period using fixed accompanying data.

FIG. 8 shows extracted stored content and corresponding fixed accompanying data for an input content group as a result of the information processing device 10 starting estimation of accompanying data related to location by performing processing from step S5 through step S25 in FIG. 3. Note that operations from step S5 through step S25 are similar to the operations in Specific Example 1. A description thereof is thus omitted. In this state, accompanying data estimation (step S30) begins.

The accompanying data estimation unit 108 then performs step S200. Since the obtained accompanying data is of one type, the accompanying data is used as is for estimation.

Next, the accompanying data estimation unit 108 performs step S205. The obtained accompanying data is fixed. Processing thus proceeds to step S215.

One method is to simply use all of the extracted accompanying data as the accompanying data for the input content group. In this case, in step S215, the accompanying data estimation unit 108 simply uses six dates and times as accompanying data. Another method is to consider the six dates and times as indicating a range rather than points. In this case, the range "from 1988/5/31, 13:37 to 2008/12/28 17:57" is used as the accompanying data for the input content group.

Yet another method is to set the new accompanying data to be a range in which time periods indicated by the accompanying data are most concentrated within a time range of a predetermined threshold. For example, if the threshold is ten years, then four dates and times are used as the new accompanying data: "1988/5/31, 13:37", "1990/5/5, 14:45", "1993/3/23, 15:07", and "1998/8/18, 15:29". Still another method is to consider these four dates and times as indicating a range rather than points. In this case, the range "from 1988/5/31, 13:37 to 1998/8/18 15:29" is used as the accompanying data for the input content group.

1.4 Modifications (1) Modification to Estimation of Accompanying Data

In the above embodiment, one type of accompanying data is used for estimation, but estimation is not limited in this way. Accompanying data for the input content group may be estimated using a plurality of types of accompanying data.

Figure 9:
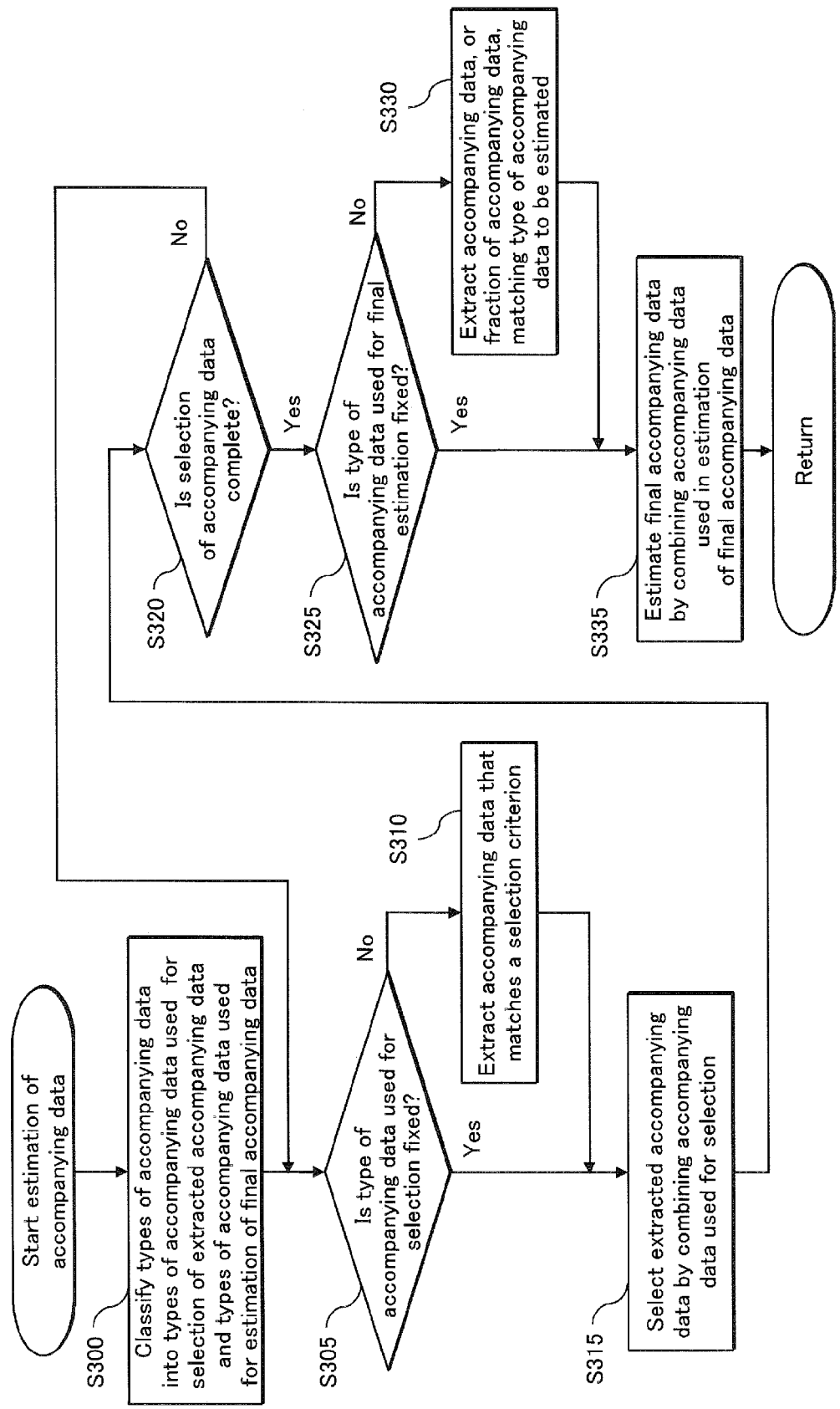
FIG. 9 is a flowchart showing estimation of accompanying data when estimating the accompanying data for contents targeted for estimation using a plurality of accompanying data items.

With reference to the flowchart in FIG. 9, the following describes operations to estimate accompanying data for an input content group using a plurality of types of accompanying data.

The accompanying data estimation unit 108 first confirms the types of accompanying data, extracted in step S25 of FIG. 3, of each stored content that includes a stored object similar to the input object. The accompanying data estimation unit 108 then classifies the types of accompanying data into types of accompanying data used to select accompanying data of the stored content and types of accompanying data used for estimation of the final accompanying data for the input content group (step S300). Specifically, the accompanying data estimation unit 108 receives, via the receiving unit 110, a designation by user operation of types of accompanying data to use for selection. The accompanying data estimation unit 108 then classifies the types of accompanying data used for estimation in accordance with the received designation.

The accompanying data estimation unit 108 determines whether one type of accompanying data, among the types of accompanying data extracted in step S300 for selection of accompanying data of the stored content, is fixed (step S305).

When determining that the one type is fixed (step S305: No), the accompanying data estimation unit 108 confirms the subject matter of the accompanying data of the one type and extracts accompanying data, or a fraction of accompanying data, that matches a selection criterion (step S310). As described in the above embodiment, the subject matter of non-fixed type accompanying data is not predetermined and therefore may not match the criterion for selection of accompanying data. It is therefore necessary to perform step S310 in order to confirm the subject matter of the accompanying data and extract accompanying data, or a fraction of accompanying data, that matches the selection criterion. The selection criterion refers to a criterion for selecting accompanying data of stored content that is estimated as being the most appropriate in step S315, described below. For example, the criterion may be as follows: to select accompanying data having a portion thereof that is shared among a plurality of accompanying data items, or fractions of accompanying data items; to select a plurality of accompanying data items that exhibit an inclusive relationship; to select the accompanying data that best matches a predetermined criterion among the extracted accompanying data or fraction of accompanying data; or to select the entire extracted accompanying data or fraction of accompanying data. Furthermore, a different criterion may be applied depending on the subject matter of the accompanying data, or on the subject matter of the accompanying data to be estimated.

After performing step S310, or when it has been determined that the one type of accompanying data is fixed (step S305: YES), the accompanying data estimation unit 108 selects the accompanying data of the stored content by combining, in accordance with the selection criterion, the fixed accompanying data determined in step S305 or the accompanying data selected in step S310 (step S315). The method of combining accompanying data may, for example, be as follows: to select stored content having a portion thereof that is shared among a plurality of accompanying data items, or fractions of accompanying data items; to select stored content including accompanying data that best matches a predetermined criterion among the extracted accompanying data or fraction of accompanying data; or to select stored contents including the entire extracted accompanying data or fraction of accompanying data. Furthermore, a different method may be used depending on the subject matter of the accompanying data, or on the subject matter of the accompanying data to be estimated.

The accompanying data estimation unit 108 checks whether selection of accompanying data is complete (steps S320).

Upon determining that selection of accompanying data is not complete (step S320: No), processing returns to step S305. The accompanying data estimation unit 108 then continues to select accompanying data of stored content.

Upon determining that selection is complete (step S320: Yes), the accompanying data estimation unit 108 determines whether the type of accompanying data used for estimation of accompanying data for the input content group is fixed (step S325).

When determining that the type is not fixed (step S325: No), the accompanying data estimation unit 108 confirms the type of accompanying data used for estimation and extracts accompanying data, or a fraction of accompanying data, that matches the type of accompanying data for the input content group targeted for estimation (step S330). This is for the same reason as described above: namely, the subject matter of non-fixed type accompanying data is not predetermined and therefore may not match the type of accompanying data to be estimated.

The accompanying data estimation unit 108 then generates the accompanying data estimated as having the highest probability of being the most appropriate for the input content group by selecting or combining the fixed type accompanying data of the stored contents and the accompanying data, or fraction of accompanying data, extracted in step S330 (step S335). The method of combining accompanying data may, for example, be as follows: to use accompanying data extracted as having a portion thereof that is shared among a plurality of accompanying data items, or fractions of accompanying data items; to use a plurality of accompanying data items that exhibit an inclusive relationship; to use accompanying data that best matches a predetermined criterion among the extracted accompanying data or fraction of accompanying data; or to use the entire extracted accompanying data or fraction of accompanying data. Furthermore, a different method may be used depending on the subject matter of the accompanying data of the stored content used for estimation, or on the subject matter of the accompanying data to be estimated.

Note that the standard for completion of selection in step S320 differs depending on the nature of the selection. For example, if one type of accompanying data is only selected once, it should be determined whether any of the types of accompanying data extracted in step S300 for selection of accompanying data of the stored content has not yet been used. On the other hand, if the same type of accompanying data is used multiple times for selection based on different selection criteria (for example, when using accompanying data that is a non-fixed keyword to select accompanying data of a stored content twice based on different criteria, such as location and time period), it should be determined whether selection of the accompanying data has been repeated a predetermined number of times.

(Specific Example)

A specific example of estimating accompanying data related to time periods from a plurality of types of fixed accompanying data of stored contents is now described.

Figure 10:
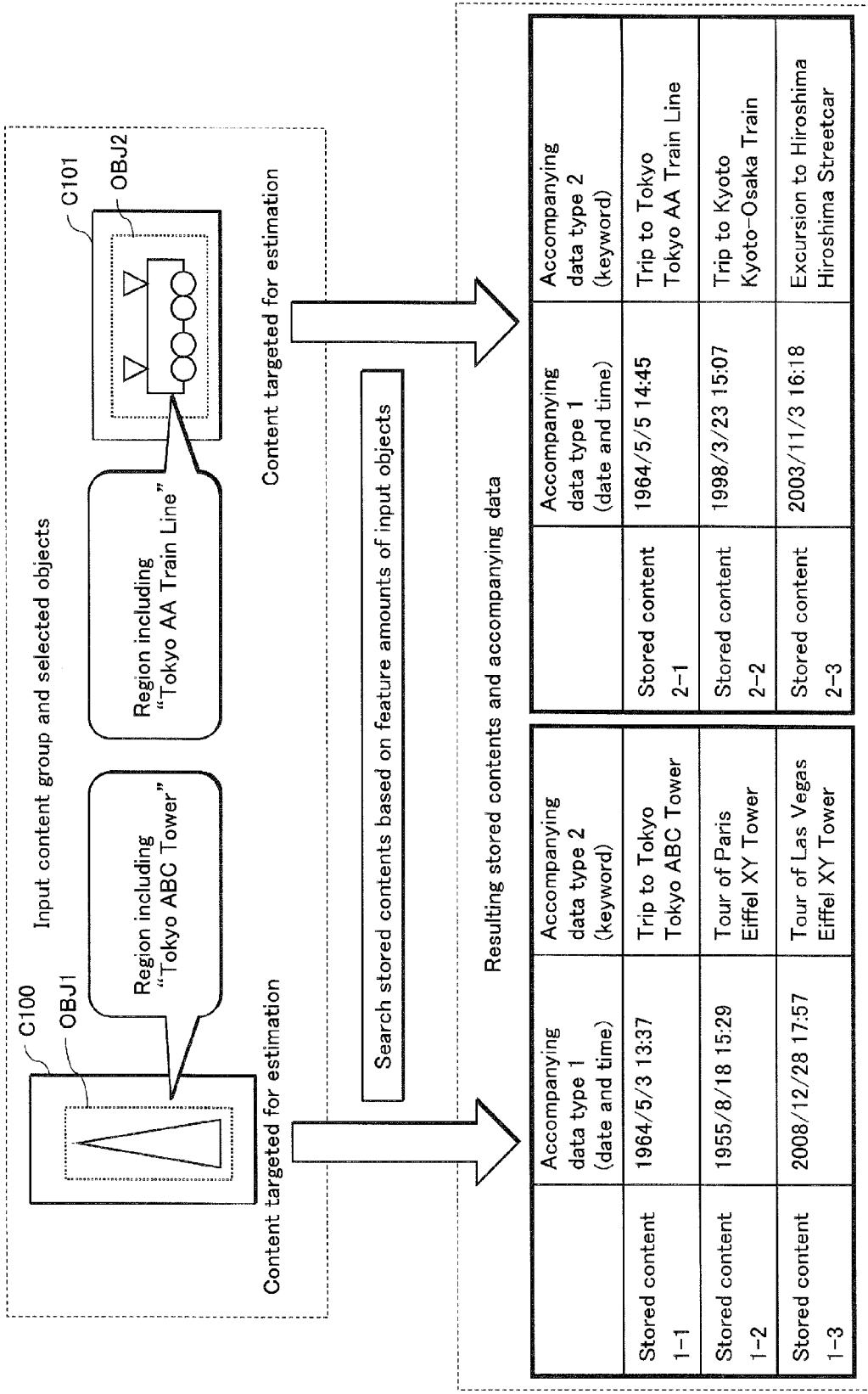
FIG. 10 shows a specific example of estimating accompanying data related to time period using a plurality of accompanying data items.

FIG. 10 shows extracted stored content and two corresponding types of accompanying data (date/time and keyword) for an input content group as a result of the information processing device 10 starting estimation of accompanying data related to location by performing processing from step S5 through step S25 in FIG. 3. Note that operations from step S5 through step S25 are similar to the operations in Specific Examples 1-3. A description thereof is thus omitted. In this state, accompanying data estimation (step S30) begins.

By performing step S300, the accompanying data estimation unit 108 for example classifies the date and time as the accompanying data (keyword) used when selecting the stored content for estimation of the final accompanying data.

The accompanying data estimation unit 108 then performs step S305. In this case, the keyword for selection is non-fixed data. Therefore, the accompanying data estimation unit 108 performs step S310 next. For example, if stored content is selected based on the criterion "location", the accompanying data estimation unit 108 selects only keywords related to location. Specifically, the accompanying data estimation unit 108 selects "Tokyo", "Paris", "Las Vegas", "Tokyo", "Kyoto", and "Hiroshima".

The accompanying data estimation unit 108 then performs step S310. Here, it is assumed that the method of selection is to select stored contents including accompanying data containing keywords with a shared portion. Specifically, the accompanying data estimation unit 108 selects the stored content 1-1 and the stored content 2-1, which both have the keyword "Tokyo".

The accompanying data estimation unit 108 then performs step S320. Since the only accompanying data classified as being for selection is a keyword, the accompanying data estimation unit 108 proceeds to step S325.

The accompanying data estimation unit 108 then performs step S325. Since the accompanying data classified as being for estimation (date and time) is fixed, the accompanying data estimation unit 108 skips step S330.

The accompanying data estimation unit 108 then performs step S335. One method is to simply use all of the extracted accompanying data as the accompanying data for the input content group. In this case, the accompanying data estimation unit 108 uses two dates and times, "1964/5/3, 13:37" and "1964/5/5, 14:45" as the accompanying data for the input content group. Another method is to consider these two dates and times as indicating a range rather than points. In this case, the accompanying data estimation unit 108 uses the range "from 1964/5/3, 13:37 to 1964/5/5, 14:45" as the accompanying data for the input content group. Yet another method is to set the new accompanying data to be a range in which time periods indicated by the accompanying data are most concentrated within a predetermined time range. In this case as well, the range "from 1964/5/3, 13:37 to 1964/5/5, 14:45" is set as the accompanying data for the input content group.

In the example in FIG. 10, suppose for example that the Tokyo ABC tower was completed in 1956. If only the date and time of accompanying data type 1 is used to estimate the time period, then "1955/8/18, 15:29", at which point the Tokyo ABC tower had not yet been completed, may end up being used as the accompanying data. It is thus clear that using a plurality of types of accompanying data is effective to narrow down the accompanying data.

(2) Modification 1 to Information Processing Device

In the above embodiment, the database 103 is provided within the information processing device 10, but the database 103 is not limited in this way. The database 103 may be located external to the information processing device 10, for example on a network.

Figure 11:
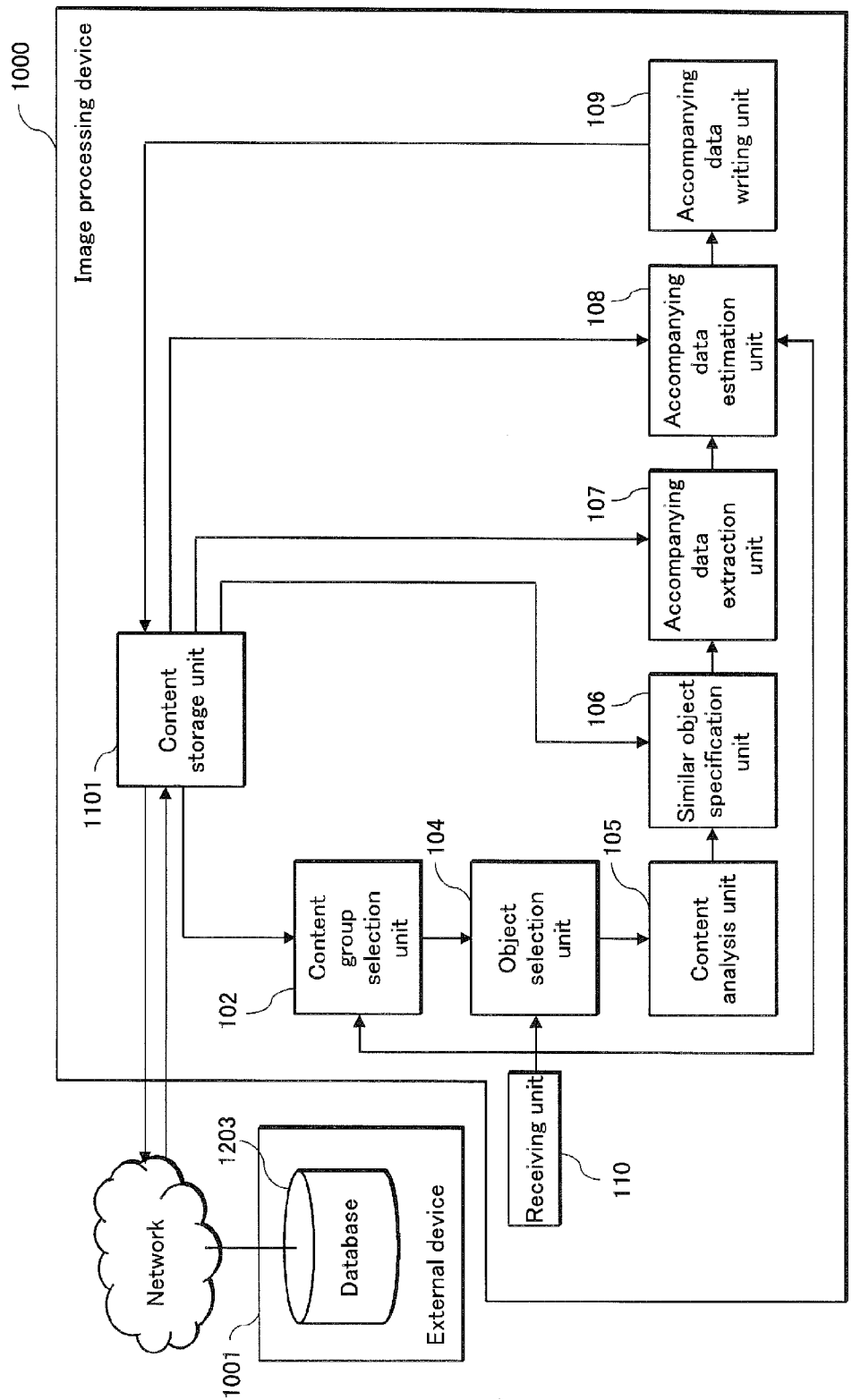
FIG. 11 is a block diagram showing the structure of an information processing device 1000.

FIG. 11 shows the internal structure of an information processing device 1000 used in a database 1203 on a network. Note that the same reference signs are provided for constituent elements having the same function as in the information processing device 10 of Embodiment 1.

The information processing device 1000 includes a content storage unit 1101, a content group selection unit 102, an object selection unit 104, a content analysis unit 105, a similar object specification unit 106, an accompanying data extraction unit 107, an accompanying data estimation unit 108, an accompanying data writing unit 109, and a receiving unit 110.

An external device 1001 is connected over a network to the information processing device 1000 and has a database 1203.

Over the network, the content storage unit 1101 stores, in the database 1203, all of the digital contents managed by the information processing device 1000, as well as the corresponding accompanying data and the feature amounts of objects included in the digital contents. The content storage unit 1101 manages the contents stored in the database 1203.

The database 1203 of the external device 1001 stores digital content data managed by the content storage unit 1101 and accompanying data for the digital content data, as well as feature amounts of objects included in the digital content data. Note that the content stored by the database 1203 is similar to the database 103 in Embodiment 1, and therefore a description thereof is omitted.

Apart from having a different target of access, operations by the information processing device 1000 to estimate accompanying data for the input content group are the same as the operations in Embodiment 1. A description of operations is therefore omitted.

(3) Modification 2 to Information Processing Device

In the above embodiment, the database 103 is provided within the information processing device 10, but the database 103 is not limited in this way. The information processing device may both use a database within the information processing device and also use a database over a network.

Figure 12:
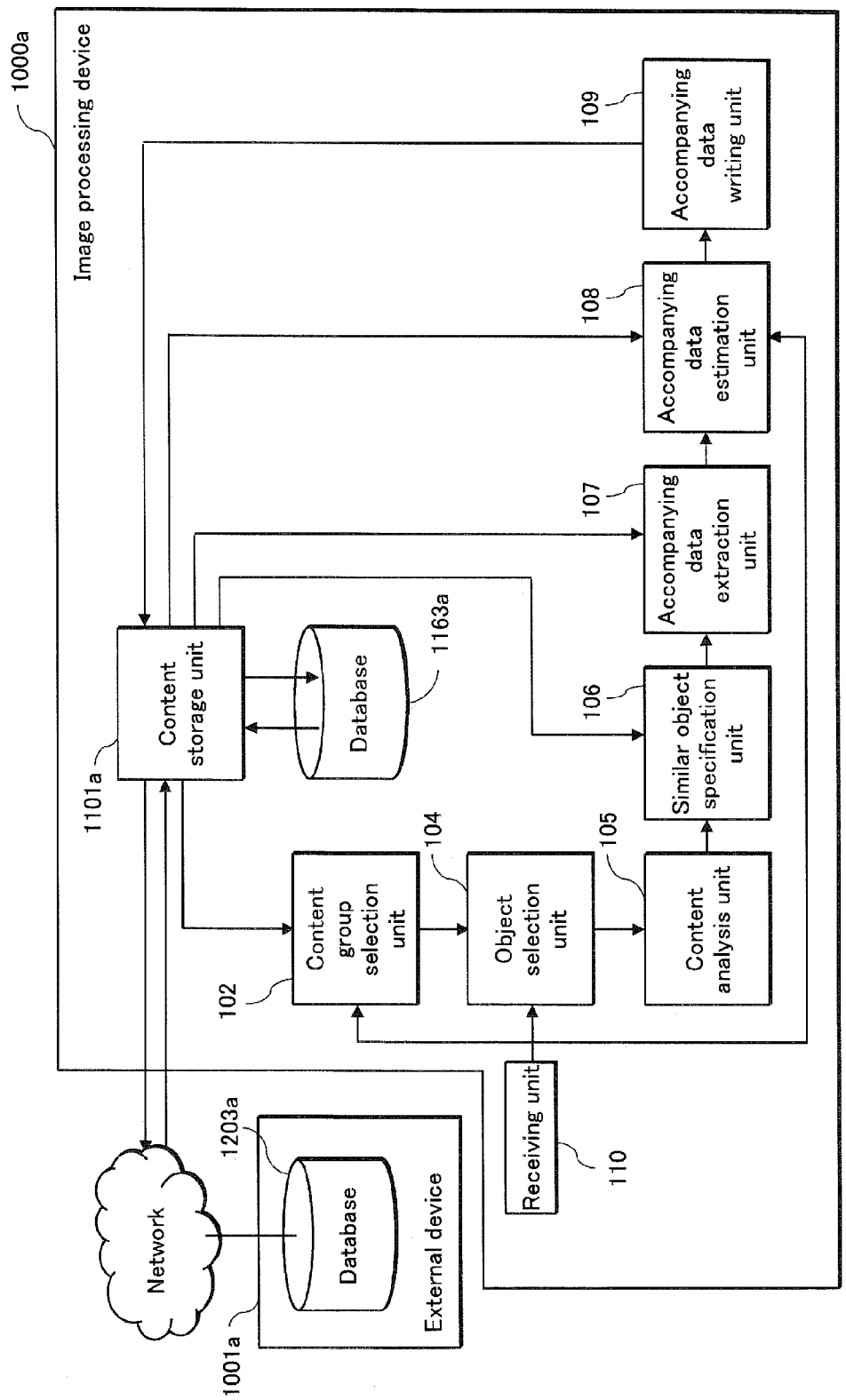

FIG. 12 shows the internal structure of an information processing device 1000a in the present modification. Note that the same reference signs are provided for constituent elements having the same function as in the information processing device 10 of Embodiment 1.

The information processing device 1000a includes a content storage unit 1101a, a content group selection unit 102, a database 1103a, an object selection unit 104, a content analysis unit 105, a similar object specification unit 106, an accompanying data extraction unit 107, an accompanying data estimation unit 108, an accompanying data writing unit 109, and a receiving unit 110.

An external device 1001a is connected over a network to the information processing device 1000a and has a database 1203a.

The content storage unit 1101a stores, in the database 1103a and the database 1203a, all of the digital contents managed by the information processing device 1000a, as well as the corresponding accompanying data and the feature amounts of objects included in the digital contents. The content storage unit 1101a manages the contents stored in the database 1103a and the database 1203a.

The database 1103a and the database 1203a store digital content data managed by the content storage unit 1101 a and accompanying data for the digital content data, as well as feature amounts of objects included in the digital content data. For example, the content storage unit 1101a may primarily use the database 1103a, using the database 1203a as a backup of the database 1103a.

Operations by the information processing device 1000a to estimate accompanying data for an input content group are the same as the operations in Embodiment 1, apart from use of the database 1103a and the database 1203a instead of the database 103. A description of operations is therefore omitted.

Note that in the above explanation, one of the two databases is described as being used for backup (in the example above, the database 1203a), but usage is not limited in this way.

For example, the content storage unit 1101 a may primarily use the database 1203a, using the database 1103a as a backup of the database 1203a. Alternatively, the information processing device 1000a may divide up all of the managed digital contents for storage in the database 1103a and the database 1203a in accordance with the capacity of the databases. Furthermore, the information processing device 1000a may store the data for the digital contents in the database 1103a and store only the feature amounts and the accompanying data for the digital contents in the database 1203a. Conversely, the information processing device 1000a may store the data for the digital contents in the database 1203a and store only the feature amounts and the accompanying data for the digital contents in the database 1103a. In other words, any method that uses both the database 1103a and the database 1203a to store the digital contents is possible.

(4) Modification 3 to Information Processing Device

In the above embodiment, the database 103 is provided within the information processing device 10, but the database 103 is not limited in this way. In addition to the database within the information processing device, the information processing device may also use a plurality of external databases.

Figure 13:
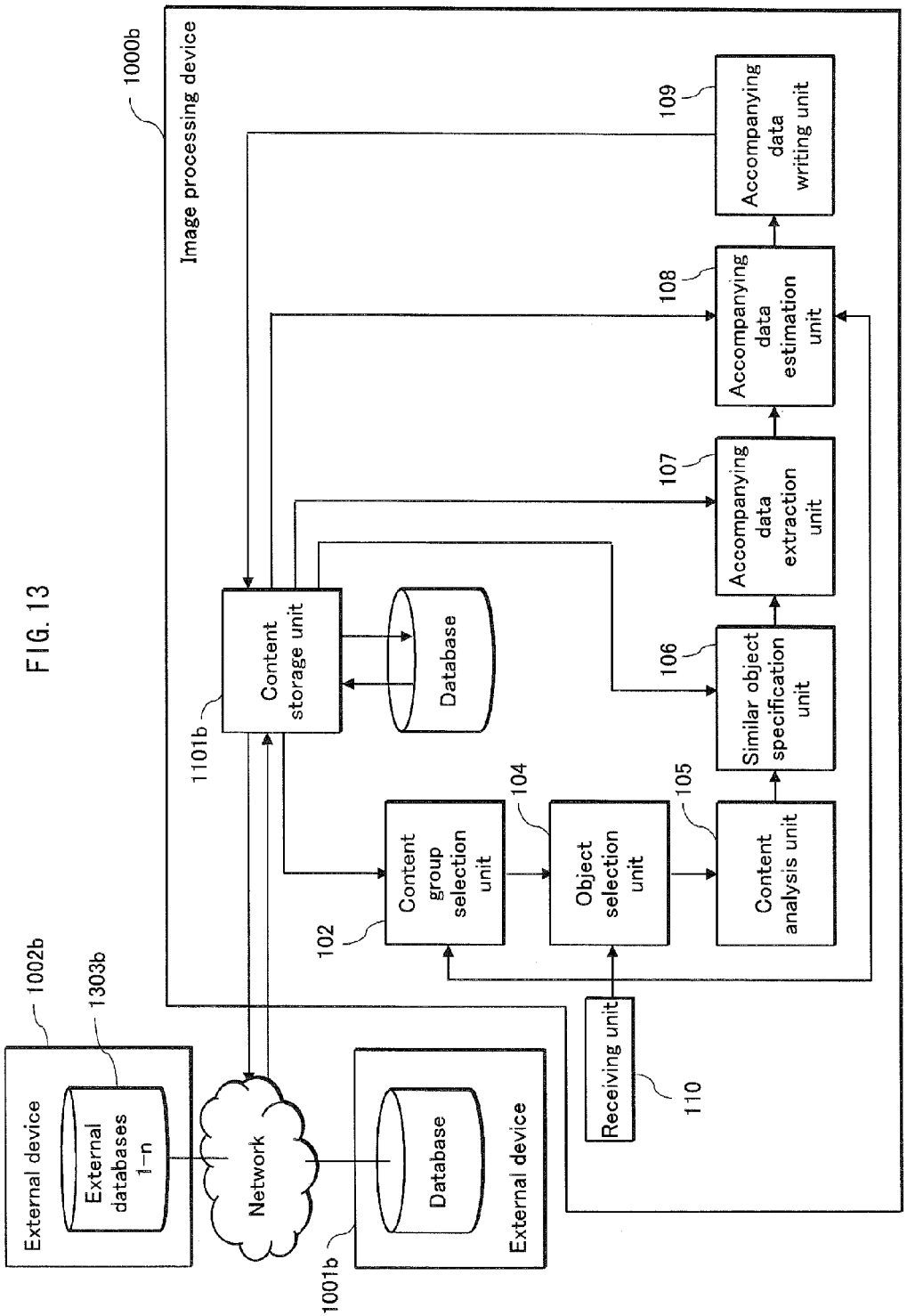
FIG. 13 is a block diagram showing the structure of an information processing device 1000b.

FIG. 13 shows the internal structure of an information processing device 1000b in the present modification. Note that the same reference signs are provided for constituent elements having the same function as in the information processing device 10 of Embodiment 1.

The information processing device 1000b includes a content storage unit 1101b, a content group selection unit 102, a database 1103b, an object selection unit 104, a content analysis unit 105, a similar object specification unit 106, an accompanying data extraction unit 107, an accompanying data estimation unit 108, an accompanying data writing unit 109, and a receiving unit 110.

An external device 1001a is connected over a network to the information processing device 1000a and has a database 1203b.

An external device 1002b is connected over a network to the information processing device 1000a and has n databases 1-n 1303b.

The content storage unit 1101b stores, in the database 1103b and the database 1203b, all of the digital contents managed by the information processing device 1000b, as well as the corresponding accompanying data and the feature amounts of objects included in the digital contents. The content storage unit 1101b manages the contents stored in the database 1103b and the database 1203b.

The database 1103b and the database 1203b store digital contents managed by the content storage unit 1101b and accompanying data for the digital contents, as well as feature amounts of objects included in the digital contents.

The databases 1-n 1303b are not managed by the information processing device 1000b. In this context, and external database is, for example, a database managed by a digital content upload site.

The content storage unit 1101b uses the databases 1-n 1303b by, for example, having the similar object specification unit 106 extract stored objects that are similar to an input object from not only the database 1103b and the database 1203b, but similarly from the digital contents managed by the databases 1-n 1303b as well. Specifically, when searching for similar objects, the similar object specification unit 106 acquires digital contents from the content storage unit 1101b for digital contents in not only the database 1103b and the database 1203b, but also the databases 1-n 1303b. The similar object specification unit 106 then analyzes the objects included in the acquired digital contents to calculate feature amounts and compares the feature amounts with the feature amounts of the input object.

The database 1103b and the database 1203b are used as in Modification 2.

Operations by the information processing device 1000b to estimate accompanying data for an input content group are the same as the operations in Embodiment 1, apart from use of the database 1103b, the database 1203b, and the databases 1-n 1303b instead of the database 103. A description of operations is therefore omitted.

Note that the method of using the database 1103b, the database 1303b, and the databases 1-n 1303b is not limited to the above method.

For example, the information processing device 1000b may analyze the objects included in the digital contents in the databases 1-n 1303b in advance and store the feature amounts and accompanying data in the database 1103b or the database 1203b for management by the content storage unit 1101b. The similar object specification unit 106 may then extract the managed feature amounts and accompanying data when searching for similar objects.

When searching for similar objects, the similar object specification unit 106 may also select a portion the digital contents managed by the information processing device 1000b in the database 1103b, the database 1203b, and the databases 1-n 1303b. For example, an indication that a stored content is to be searched may be included in the accompanying data for the stored content, and the similar object specification unit 106 may compare only the feature amounts for stored contents whose accompanying data includes such an indication. Furthermore, if it is necessary to reduce the amount of calculation or increase processing speed, only stored contents including stored objects whose feature amounts have been analyzed in advance may be targeted for comparison of feature amounts, excluding from the comparison stored contents with unanalyzed feature amounts.

Depending on the method of generating the accompanying data of the stored content, degrees of priority may be assigned when determining similarity. For example, one method is to determine that accompanying data attached to digital contents directly by a digital still camera upon shooting, or accompanying data attached directly by a user, is highly reliable. During extraction of similar objects from stored content to which such accompanying data is attached, the allowable range of the difference in feature amounts may then be increased.

Furthermore, depending on the type of database, degrees of priority may be assigned when determining similarity. For example, the allowable range of the difference in feature amounts may be increased when extracting similar objects from the database 1103b or the database 1203b, which are managed by the information processing device 1000b. Conversely, the allowable range of the difference in feature amounts may be decreased when extracting similar objects from the databases 1-n 1303b.

The allowable range of the difference in feature amounts may also be increased when extracting similar objects from a database, among the external databases 1-n 1303b, which a user frequently uses.

Note that the above methods are only examples. The methods of using the digital content data on the external databases 1-n 1303b are not limited to the above methods.

Furthermore, the methods of using the database 1103b and the database 1203b are not limited to the methods described in Modification 2. For example, the database 1103b may store all of the content data, feature amounts, and accompanying data managed by the information processing device 1000b, and the database 1203b may store the analysis results, feature amounts, and accompanying data of the digital contents on the external databases 1-n 1303*b*. Alternatively, the database 1203*b* may store all of the content data, feature amounts, and accompanying data managed by the information processing device 1000*b*, and the database 1103*b* may store the analysis results, feature amounts, and accompanying data of the digital contents on the external databases 1-n 1303*b*.

The above methods of using the database 1103*b* and the database 1203*b* are only examples. Usage is in no way limited to these examples.

(5) Modification 4 to Information Processing Device

In the above embodiment, the contents targeted for estimation are located in the database 103, but the location is not limited in this way. The information processing device may retrieve contents for estimation from an external source.

Figure 14:
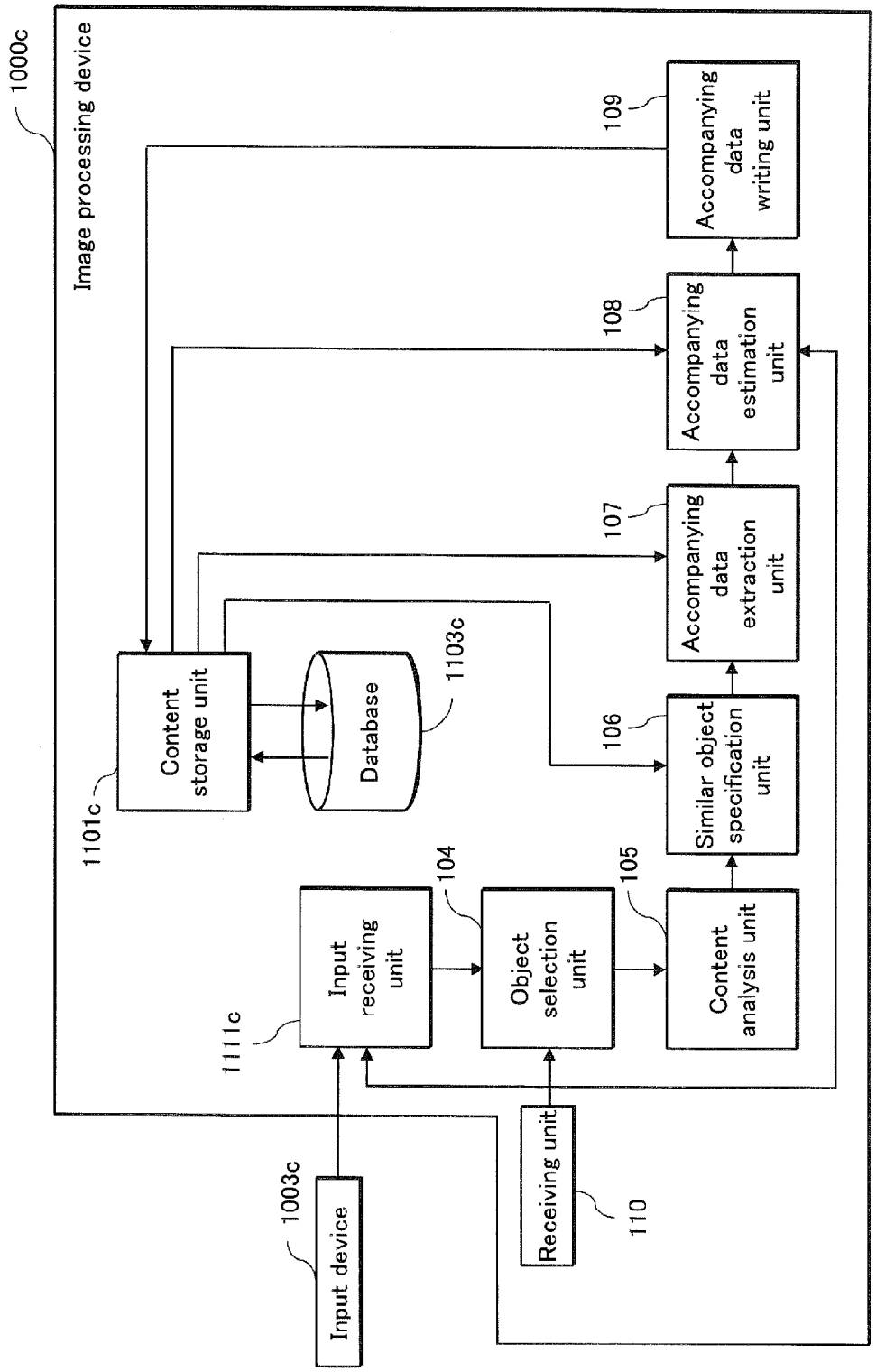
FIG. 14 is a block diagram showing the structure of an information processing device 1000c.

FIG. 14 shows the internal structure of an information processing device 1000*c* in the present modification. Note that the same reference signs are provided for constituent elements having the same function as in the information processing device 10 of Embodiment 1.

The information processing device 1000*c* includes a content storage unit 1101*c*, an input receiving unit 1111*c*, a database 1103*c*, an object selection unit 104, a content analysis unit 105, a similar object specification unit 106, an accompanying data extraction unit 107, an accompanying data estimation unit 108, an accompanying data writing unit 2109, and a receiving unit 110.

The content storage unit 1101*c* stores, in the database 1103*c*, all of the digital contents managed by the information processing device 1000*c*, as well as the corresponding accompanying data and the feature amounts of objects included in the digital contents. The content storage unit 1101*c* manages the contents stored in the database 1103*c*.

The input receiving unit 1111*c* receives input, from an input device 1003*c*, of one or more contents targeted for estimation. All of the contents targeted for estimation that are input are classified into one or more input content groups. The method of classifying into input content groups is similar to the operations of the content group selection unit 102 in Embodiment 1. Details are thus omitted.

The database 1103*c* stores digital contents managed by the content storage unit 1101*c*, in particular the stored contents described in Embodiment 1.

The input device 1003*c* is for inputting contents targeted for estimation into the information processing device 1000*c*. The input device 1003*c* is, for example, a digital still camera, video camera, Personal Computer (PC), Personal Video Recorder (PVR), or the like that store digital contents. The input device 1003*c* is not limited to these devices and may be any device storing digital contents.

Operations by the information processing device 1000*c* to estimate accompanying data for the input content group are the same as the operations in Embodiment 1, apart from the way in which contents targeted for estimation are acquired. A description of operations is therefore omitted.

1.5 Other Modifications

Other than the above embodiment and modifications, the present invention includes, for example, the following modifications.

(1) In the above embodiment, the stored content in the database 103 has been described as digital content data, feature amounts of the entire content, feature amounts of objects included in the content, and accompanying data, yet the stored content is not limited in this way.

The database 103 may be configured to store digital content data and associated accompanying data, without storing data for various types of feature amounts.

In this case, the similar object specification unit 106 calculates the feature amounts of the stored content and the feature amounts of the objects included in the stored contents.

(2) In the above embodiment, the contents targeted for estimation have been described as being managed without associated feature amounts, but the contents targeted for estimation are not limited in this way.

Feature amounts of an entire content targeted for estimation and feature amounts of an object included in the content targeted for estimation, i.e. an input object, may be stored in the database 103 in association with the content targeted for estimation. In this case, the content analysis unit 105 uses feature amounts associated in advance.

(3) In the above embodiment, the contents targeted for estimation are not associated with accompanying data in advance, but the contents targeted for estimation are not limited in this way.

Digital content associated with accompanying data may be a content targeted for estimation. In this case, accompanying data that has not yet been associated with the digital content is estimated.

For example, if only a date and time is associated with a content as accompanying data, the information processing device 10 may estimate a GPS position.

(4) In the above embodiments, the method of selecting contents targeted for estimation has been described as reception, by the receiving unit 110, of an instruction via a remote control, mouse, keyboard, or the like, but the method of selection is not limited in this way.

If the information processing device 10 is provided with a touchscreen as the receiving unit 110, the contents targeted for estimation may be selected by the user touching the screen with a finger or with a stylus such as a touch pen.

Furthermore, the information processing device 10 may be provided with a dedicated reception device as the receiving unit 110 for input of gestures or speech.

Note that the receiving unit 110 is in no way limited to the above examples.

Furthermore, the content group selection unit 102 may select a different selection criterion, not based on user input, for selection of contents targeted for estimation. Such a selection criterion may, for example, be that accompanying data, or a fraction thereof, is lacking.

The accompanying data of a digital content may also include selection information specifying that the digital content is to be selected. In this case, the content group selection unit 102 may refer to the selection information to select the contents targeted for estimation.

Additionally, contents targeted for estimation may be divided into groups and stored in advance. In this case, the content group selection unit 102 treats one such group as an input content group.

Note that the above methods of selection by the content group selection unit 102 are only examples, and selection is not limited to these methods.

(5) The method of classifying the contents targeted for estimation into input content groups is not limited to the method described in Embodiment 1. For example, when performing estimation for digital contents with accompanying data attached thereto, a plurality of contents targeted for estimation may be grouped based on indices such as date and time, event, or location.

(6) The type of accompanying data used for estimation has been described as being received as user input, but the type is not limited in this way.

The following sort of method may be used to select the type of accompanying data used for estimation.

Accompanying data that matches the type of accompanying data of the input content group that is targeted for estimation may be selected. Alternatively, a type of accompanying data that is lacking in the input content group, or a type of accompanying data as indicated in the accompanying data of the stored contents may be selected.

Note that the above methods of selection of accompanying data are only examples, and selection is not limited to these methods.

(7) The method of estimating accompanying data for the contents targeted for estimation is not limited to the methods in the above embodiment.

For example, a portion that is shared among a plurality of accompanying data items, or fractions of accompanying data items, may be extracted and used as accompanying data.

A plurality of accompanying data items that exhibit an inclusive relationship may be used as accompanying data, or the accompanying data that best matches a predetermined criterion among the extracted accompanying data or fraction may be used as accompanying data.

Additionally, the entire extracted accompanying data or fraction of accompanying data may be used.

Furthermore, a different estimation method may be used depending on the subject matter of the accompanying data of the stored content used for estimation, or on the subject matter of the accompanying data to be estimated.

(8) When using a plurality of types of accompanying data, the method for classifying types for estimation and types for selection is not limited to the above methods.

For example, if a type of accompanying data matches the type of accompanying data of the input content group that includes the contents targeted for estimation, that type of accompanying data may be classified as a type for estimation, and the remaining types of accompanying data may be classified for selection.

The types of accompanying data used for estimation or selection may also be classified in accordance with an indication in the accompanying data of types of accompanying data of stored contents.

Note that the above methods of classification of accompanying data are only examples, and selection is not limited to these methods.

(9) In the above embodiment, the object selection unit 104 receives a user indication of objects included in the contents targeted for estimation, but the object selection unit 104 is not limited in this way.

The object selection unit 104 may recognize objects within a digital content using general object recognition technology in order to select an object appropriate for estimation of accompanying data.

Furthermore, if an object to be selected is indicated in the accompanying data of a digital content included in the input content group, the object selection unit 104 may select the object indicated in the accompanying data as the input object.

Note that the method of selecting an object is not limited to these methods.

(10) Specification of similar objects by the similar object specification unit 106 is not limited to the above methods.

For example, when extracting similar objects to the input objects, the similar object specification unit 106 does not always have to compare the feature amounts of the input object with every stored object in every stored content in the database 103. In this case, the accompanying data of a stored content may include an indication that comparison of feature amounts is to be made for the stored content. The similar object specification unit 106 may then extract and compare feature amounts only for stored contents that include this indication.

Alternatively, when similar objects to the input objects are extracted, weighting in accordance with the method of generating accompanying data of the stored content may be used in the comparison between feature amounts of stored objects and feature amounts of input objects. For example, accompanying data attached to digital contents directly by a digital still camera upon shooting, or accompanying data attached directly by a user, can be considered more reliable. The allowable range of the difference in feature amounts may therefore be increased when determining whether a stored object included in a stored content to which highly reliable accompanying data is attached is a similar object. The target of comparison of feature amounts may be restricted to stored objects included in stored contents to which highly reliable accompanying data is attached. Furthermore, if it is necessary to reduce the amount of calculation or increase processing speed, only stored contents including stored objects whose feature amounts have been analyzed in advance may be targeted for comparison, excluding from comparison stored contents with unanalyzed feature amounts.

Note that the method of selecting a stored object for comparison of feature amounts is not limited to these methods.

(11) If the similar object specification unit 106 performs weighting when comparing feature amounts, the accompanying data writing unit 109 may further record an indication that the accompanying data was derived using weighting.

(12) In the above embodiment, when a similar object is extracted for an input object, a weight may be added to the extracted similar object (a matching ratio with the input object, i.e. a degree of reliability of the matching), and the accompanying data for the input content group may be estimated based on the attached weight. For example, it is possible to use accompanying data for similar objects with the highest weight among weighted similar objects.

The weight of similar objects is not limited to the matching ratio with the input object, but may instead be based on the number of the same objects included in the contents targeted for estimation. For example, the weight may be a ratio of the number of same objects to the total number of objects.

(13) In the above embodiment, the input content may differ in type from the digital content selected as the stored content. For example, a video may be selected as the input content, whereas a still image may be selected as the stored content. Conversely, a still image may be selected as the input content, whereas a video may be selected as the stored content.

Furthermore, a plurality of types of digital content may be selected as the input content or the stored content. For example, both a still image and a video may be selected as the input content.

1.7 Summary

As described above, the information processing device in the embodiment and the modifications can estimate accompanying data for all of the contents targeted for estimation included in the input content groups from accompanying data associated with stored contents that include similar objects.

2. Embodiment 2

The following describes the internal structure of an information processing device in Embodiment 2 of the present invention.

2.1 Structure

In Embodiment 1, the accompanying data for the contents targeted for estimation is estimated based on the accompanying data associated with stored content. In Embodiment 2, on the other hand, the accompanying data for the contents targeted for estimation is estimated based on dictionary data prepared in advance.

The following describes the structure of the information processing device 2000 in the present embodiment. Note that the same reference signs are provided for constituent elements having the same function as in the information processing device 10 of Embodiment 1.

Figure 15:
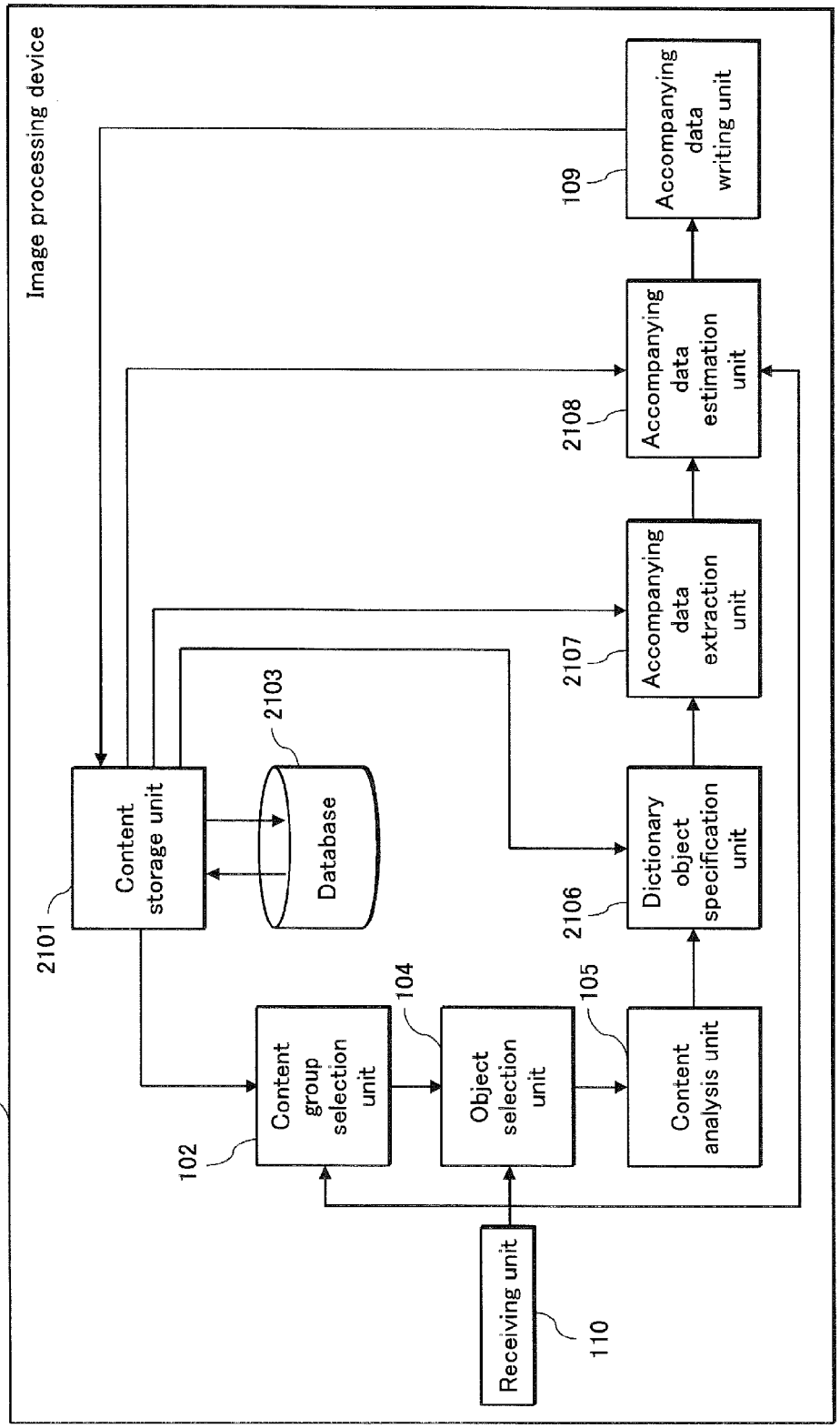
FIG. 15 is a block diagram showing the structure of an information processing device 2000.

As shown in FIG. 15, the information processing device 2000 includes a content storage unit 2101, a content group selection unit 102, a database 2103, an object selection unit 104, a content analysis unit 105, a dictionary object specification unit 2106, an accompanying data extraction unit 2107, an accompanying data estimation unit 2108, an accompanying data writing unit 109, and a receiving unit 110.

(1) Database 2103

Figure 16:
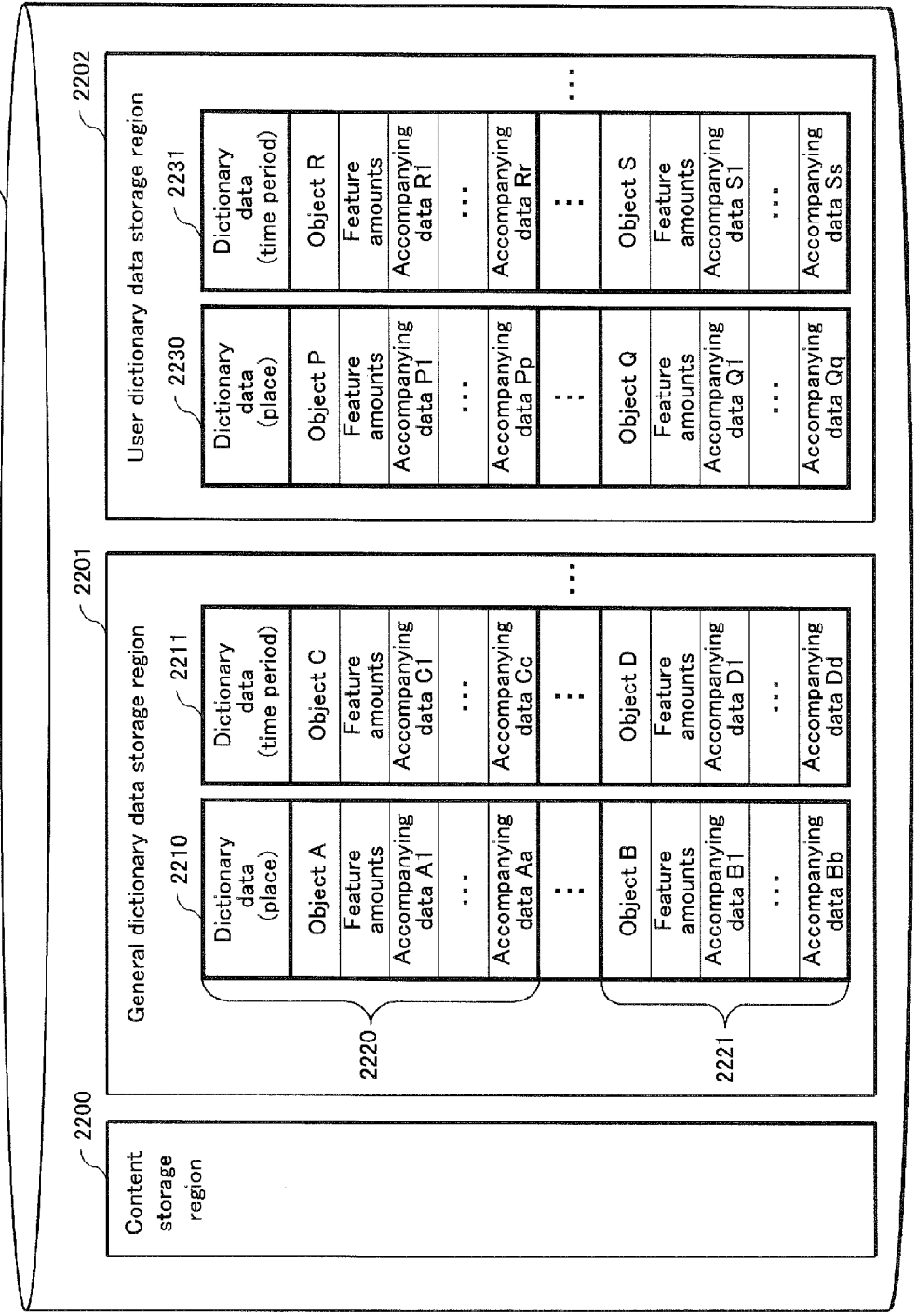
FIG. 16 shows an example of the data structure of a database 2103.

As shown in FIG. 16, the database 2103 includes a content storage region 2200, a general dictionary data storage region 2201, and a user dictionary data storage region 2202.

The content storage region 2200 stores stored contents and contents targeted for estimation, as in Embodiment 1. Since the stored contents and the contents targeted for estimation have been described in Embodiment 1, a description thereof is omitted here.

The general dictionary data storage region 2201 and the user dictionary data storage region 2202 are regions storing dictionary data.

Dictionary data refers to data that links a dictionary object with feature amounts of the dictionary object and with accompanying data estimated from the dictionary object.

The dictionary data is divided into general dictionary data and user dictionary data. General dictionary data is a general collection of links between objects and accompanying data, whereas user dictionary data is a user-defined collection of links between objects and accompanying data. The general dictionary data is stored in the general dictionary data storage region 2201, whereas the user dictionary data is stored in the user dictionary data storage region 2202.

The general dictionary data storage region 2201 stores dictionary data 2210, 2211, . . . related to location, time period, and the like. For example, the dictionary data 2210 is related to location, and the dictionary data 2211 is related to time period.

The user dictionary data storage region 2202 stores dictionary data 2230, 2231, . . . related to location, time period, and the like. For example, the dictionary data 2230 is related to location, and the dictionary data 2231 is related to time period.

The dictionary data includes a plurality of combinations of a dictionary object, the feature amounts for the dictionary object, and one or more accompanying data items (hereinafter, "object information"). For example, the dictionary data 2210 includes object information 2220, . . . , 2221. The object information 2220 is composed of a dictionary object (object A), the feature amounts for the dictionary object, and one or more accompanying data items (in this case, accompanying data A1, . . . , Aa). Each accompanying data item is also used to identify the corresponding object.

The following describes a specific example of the content of dictionary data. If objects in a photograph taken by a digital still camera include "Tokyo ABC Tower", a keyword related to location, such as "Tokyo" or "ABC town" can easily be estimated as a keyword for the location where the photograph was produced. In this case, the dictionary object in the general dictionary is set to "Tokyo ABC Tower", and the accompanying data for the dictionary object is set to "Tokyo", "ABC town", or the like. In this way, dictionary data indicating the location of an object, thereby limiting the location in which the object exists, is included in the dictionary data 2210 as dictionary data related to location.

On the other hand, if objects in a photograph taken by a digital still camera include a "car", the time frame from the year in which sales of the "car" begin until approximately ten years after manufacturing of the "car" was discontinued can be offered as a likely candidate for dictionary data related to the time period for production of the photograph. This is because a new model of a "car" typically comes out every few years, the manufacturing and sale of a certain type of "car" is limited, and the average life expectancy of a "car" is approximately ten years. It is plausible, however, for a "car" to be in use for more than ten years. Therefore, accompanying data related to the time period of a dictionary object may be listed in conjunction with accompanying data related to a probability of existence for each time period. An object whose time frame of existence is limited may in this way be treated as dictionary data indicating a time period.

If objects in a photograph taken by a digital still camera include a "car the user owned from 1990 to 1995", accompanying data related to a time period, such as "from 1990 to 1995", can easily be estimated as a time period in which the photograph was produced. In this sort of case, the dictionary object in the user dictionary data is set to "car the user owned from 1990 to 1995", and the accompanying data for the dictionary object is set to "from 1990 to 1995". In this way, dictionary data can indicate the time frame or location of an object, thereby limiting the time period or location in which the object exists, among objects related to a user.

(2) Content Storage Unit 2101

The content storage unit 2101 stores and manages the stored contents, the contents targeted for estimation, and the dictionary data in the database 2103.

(3) Dictionary Object Specification Unit 2106

The dictionary object specification unit 2106 extracts, from among objects in the dictionary data managed by the content storage unit 2101, one or more objects (dictionary objects) in the dictionary data that are similar to each input object.

(4) Accompanying Data Extraction Unit 2107

For each of the dictionary objects extracted from the dictionary data for each input object, the accompanying data extraction unit 2107 extracts all of the accompanying data associated with the dictionary object.

(5) Accompanying Data Estimation Unit 2108

The accompanying data estimation unit 2108 uses the extracted accompanying data to estimate accompanying data for each input content group.

The method of estimation may be similar to the method in Embodiment 1 when accompanying data related to probability of existence is not indicated in the accompanying data of the dictionary object. On the other hand, when such probability of existence is indicated, the probability of existence indicated for each accompanying data item is added together between accompanying data items, and the accompanying data item with the largest resulting sum of probabilities of existence is used as the accompanying data.

2.2 Operations (1) Outline of Operations

The following describes an outline of operations by the information processing device 2000 with reference to the flowchart in FIG. 17.

The content group selection unit 102 classifies one or more contents targeted for estimation into one or more input content groups based on user operation (step S400).

The object selection unit 104 selects one or more input objects for each content targeted for estimation included in each input content group (step S405). Specifically, as in Embodiment 1, the object selection unit 104 receives a designation, provided by user operation, of a region that includes an object in the content targeted for estimation. Upon receiving the designation, the object selection unit 104 selects the designated region as an input object.

The content analysis unit 105 calculates feature amounts for each of the one or more input objects selected by the object selection unit 104 (step S410).

For each of the input objects extracted in step S405, the dictionary object specification unit 2106 extracts one or more dictionary objects that are similar to the input object from among one or more objects included in each piece of the dictionary data (step S415). The determination of similarity between an object and an input object is similar to Embodiment 1. A description of the determination is thus omitted here.

For each of the one or more dictionary objects extracted in step S415, the accompanying data extraction unit 2107 extracts the accompanying data of the dictionary object (step S420).

The accompanying data estimation unit 2108 uses the accompanying data extracted in step S420 to estimate accompanying data for each input content group (step S425).

For each input content group, the accompanying data writing unit 109 records the accompanying data estimated in step S425 for all of the contents targeted for estimation included in the input content group (step S430).

(2) Classification

The classification shown in step S400 of FIG. 17 can be achieved by similar operations as in the flowchart of FIG. 4. A description of the classification is thus omitted here.

(3) Estimation of Accompanying Data

Figure 18:
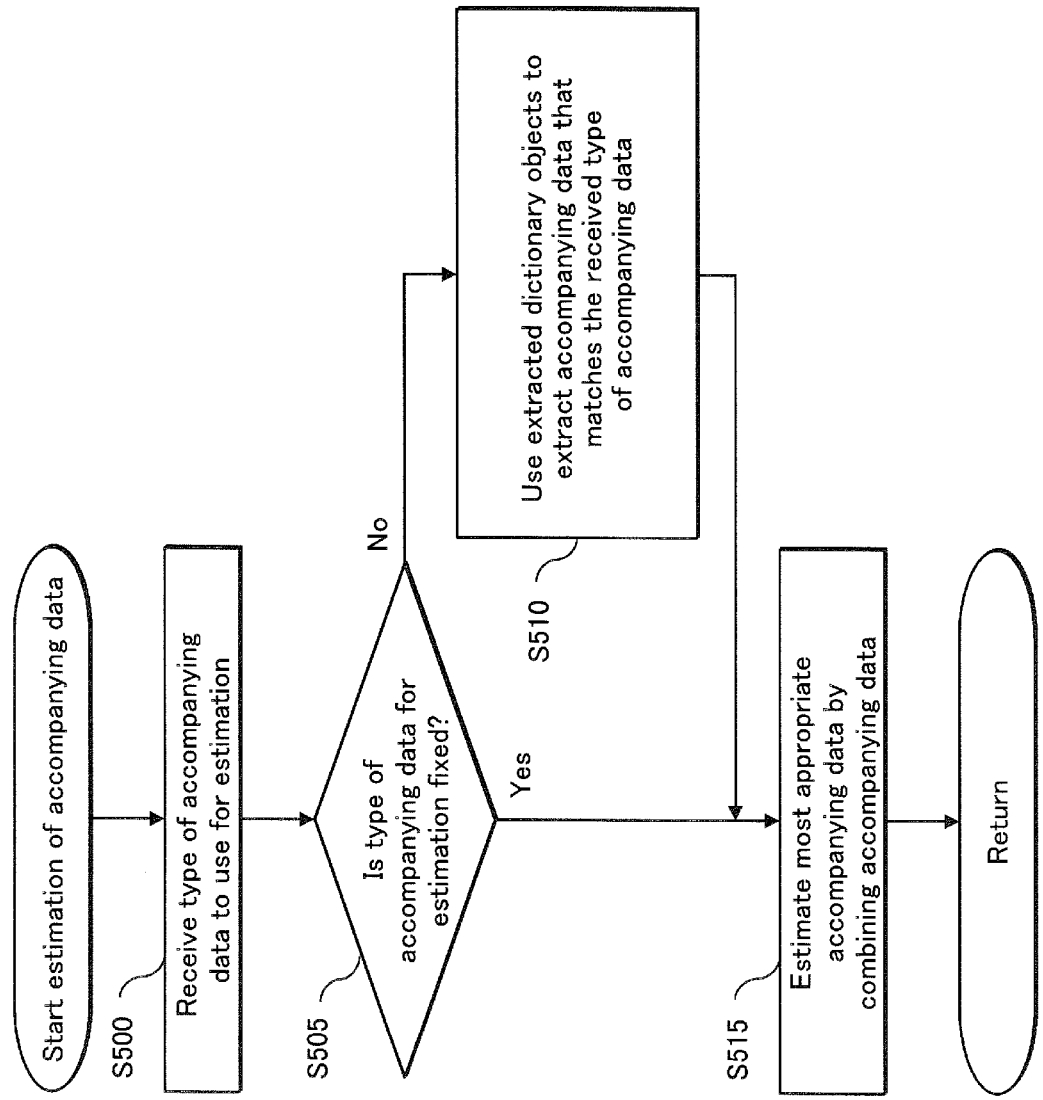
FIG. 18 is a flowchart of operations for estimation of accompanying data by the information processing device 2000.

The following describes the estimation of accompanying data in step S425 of FIG. 17 in detail with reference to the flowchart in FIG. 18. Note that this estimation process is performed for each content targeted for estimation.

Via the receiving unit 110, the accompanying data estimation unit 2108 receives a user indication of a type of accompanying data to use for estimation from among the accompanying data of dictionary objects extracted in step S420 of FIG. 17 (step S500).

The accompanying data estimation unit 2108 determines whether the received type of accompanying data is fixed (step S505). Specifically, as in Embodiment 1, the accompanying data estimation unit 2108 determines whether the received type of accompanying data is fixed based on the storage region, for a stored content, of accompanying data corresponding to the received type of accompanying data.

If the type of accompanying data is not fixed, i.e. if the type of accompanying data is determined to be non-fixed (step S505: No), the accompanying data estimation unit 2108 uses one or more dictionary objects for each input content group to extract accompanying data, or a fraction of accompanying data, that matches the received type of accompanying data (step S510).

After performing step S510, or when it has been determined that the received type of accompanying data is fixed (step S505: YES), the accompanying data estimation unit 2108 selects or combines the fixed accompanying data, or the accompanying data or a fraction thereof extracted in step S510, in order to generate the accompanying data estimated as having the highest probability of being the most appropriate accompanying data for the input content group (step S515).

2.3 Modifications

Other than the above embodiment, the present invention includes, for example, the following modifications.

(1) In the above embodiment, when extracting dictionary objects similar to an input object, the dictionary object specification unit 2106 compares the feature amounts of the input object with the feature amounts of each object in every piece of dictionary data, but comparison is not limited in this way.

It is not necessary to compare every object with the feature amounts of the input object. For example, the accompanying data of an object may include an indication that comparison of feature amounts is to be made for the object. Only such objects may then be extracted for comparison of feature amounts.

Alternatively, when similar dictionary objects to the input objects are extracted, weighting in accordance with the type of dictionary data may be used in the comparison between feature amounts of dictionary objects and feature amounts of input objects. For example, if the user dictionary data is to be prioritized, the allowable range of the difference in feature amounts may be increased when determining whether an object included in the user dictionary data is a dictionary object similar to an input object. Alternatively, the target of comparison of feature amounts may be limited to objects included in the user dictionary data to be prioritized. Another option is to weight the similarity of a dictionary object in accordance with the degree of reliability of the creator of the dictionary. Note that the method of selecting an object for comparison of feature amounts is not limited to these methods.

(2) In the above embodiment, when probability of existence is indicated, the accompanying data estimation unit 2108 adds the probability of existence indicated for each accompanying data item together and uses the accompanying data item with the largest resulting sum of probabilities of existence as the accompanying data. However, operations are not limited in this way.

For example, the accompanying data estimation unit 2108 may use all accompanying data whose sum of probabilities of existence is higher than a certain threshold.

Furthermore, different conditions may be set depending on the subject matter of the accompanying data used for estimation, or on the subject matter of the accompanying data to be estimated.

(3) The information processing device shown in Embodiment 2 may perform estimation of accompanying data using a database on a network as shown in FIGS. 11 and 12, estimation of accompanying data using the databases 1-n shown in FIG. 13, or estimation of accompanying data using an input device as shown in FIG. 14.

In this case, operations differ only in that accompanying data of dictionary objects is used, and in that probability of existence is used as the method of estimating accompanying data, as shown in the example in 19. The concept behind operations, however, does not differ, and thus a description is omitted here.

Furthermore, estimation using accompanying data of similar objects, as in Embodiment 1, and estimation using accompanying data of dictionary objects, as in the present embodiment, may be combined. In this case, the method of estimating accompanying data using similar objects and the method of estimating accompanying data using dictionary objects may be performed either in parallel or sequentially in order to select or estimate accompanying data.

2.4 Specific Example

Next, a specific example of using dictionary data to estimate accompanying data regarding time period is described.

Figure 19:
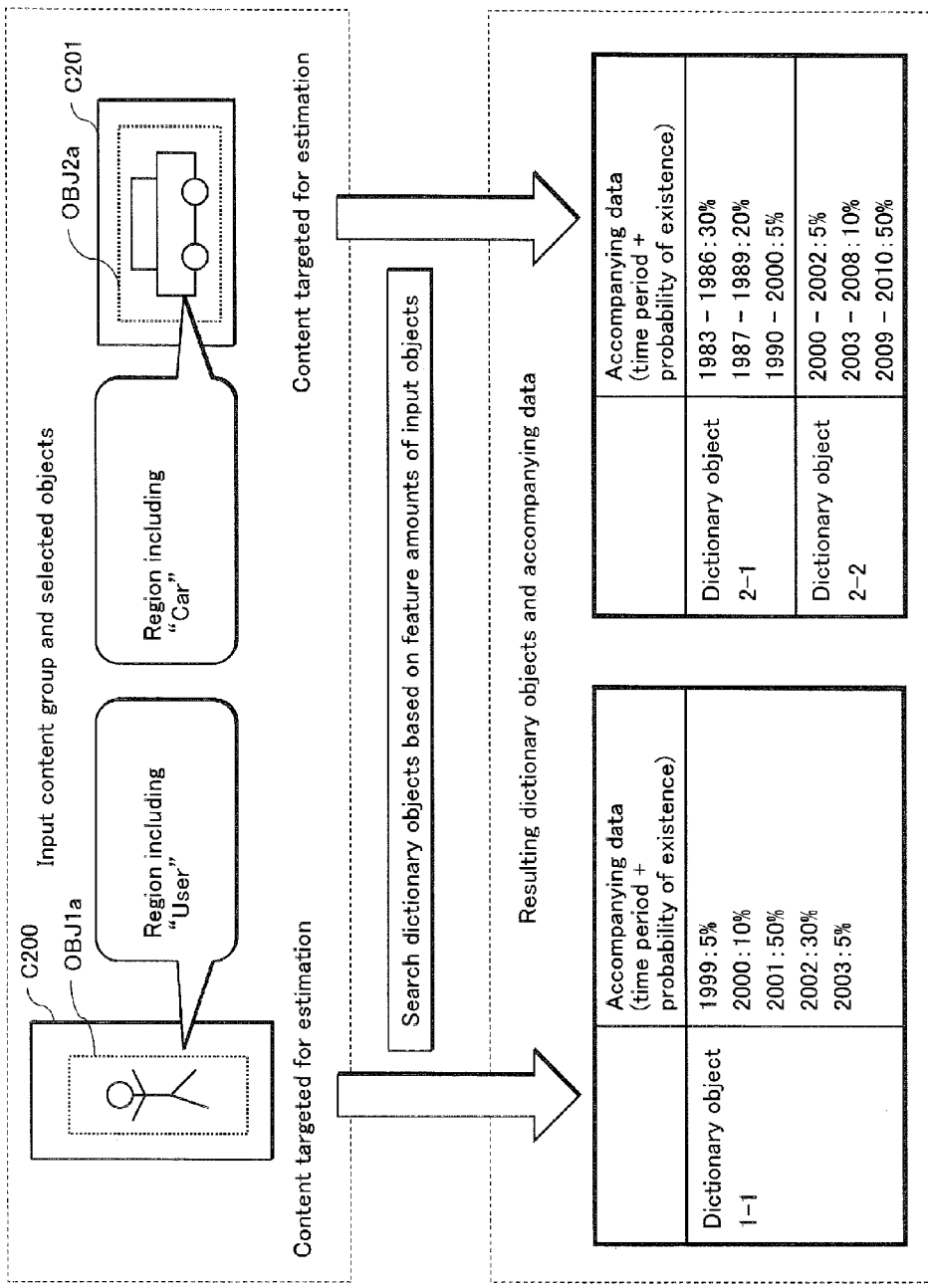
FIG. 19 shows a specific example of estimating accompanying data related to time period using dictionary data.
Figure 20:
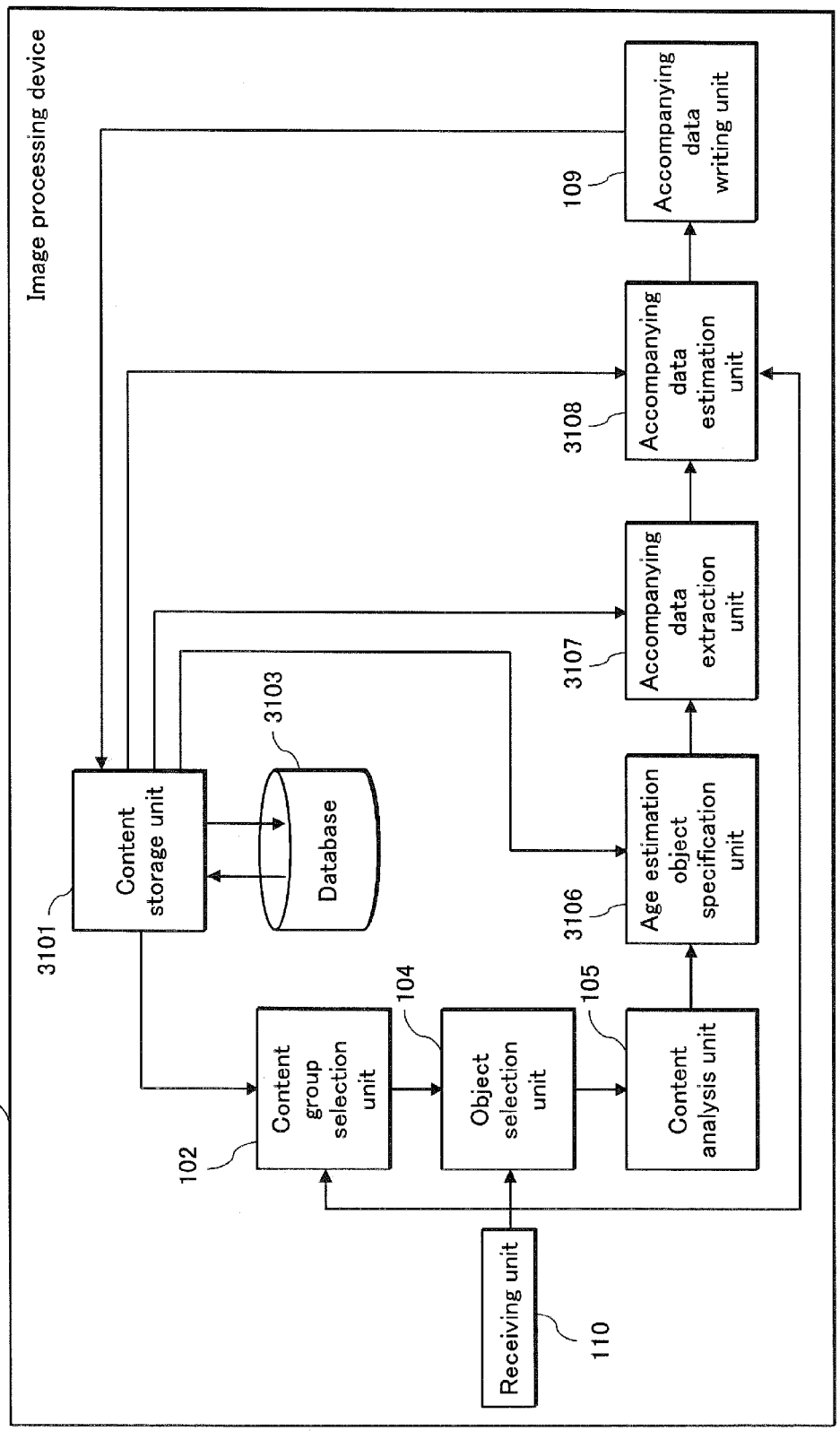
FIG. 20 is a block diagram showing the structure of an information processing device 3000.

FIG. 19 shows dictionary objects and corresponding fixed accompanying data (time period and probability of existence) obtained as a result of the information processing device 2000 starting estimation of accompanying data related to time period by performing processing from step S400 through step S420 in FIG. 17.

The following is a detailed description of the steps through which the accompanying data for the dictionary objects shown in FIG. 19 is obtained. In step S400, the content group selection unit 102 selects a photograph that includes a "user" (contents targeted for estimation C200) and a photograph that includes a "car" (contents targeted for estimation C201) as an input content group.

Next, in step S405, the object selection unit 104 selection a region that includes the "user" in the contents targeted for estimation C200 (hereinafter, OBJ1$a$) and a region that includes the "car" (hereinafter, OBJ2$a$) as input objects.

Next, in step S410, the content analysis unit 105 calculates the feature amounts of the two input objects (OBJ1$a$, OBJ2$a$).

In step S415, the dictionary object specification unit 2106 extracts dictionary objects having feature amounts that are close to the feature amounts of either of the two input objects. Specifically, for OBJ1$a$, a face recognition function is used to recognize that the object is the "user", and relationships between faces and time periods in the user dictionary are referred to in order to extract time periods, along with probabilities, for a face resembling the "user". For OBJ2$a$, two "cars" that are similar are extracted and displayed along with time periods and probabilities of existence. In this state, accompanying data estimation (step S425) begins.

Next, the accompanying data estimation unit 2108 performs step S500. Since the obtained accompanying data is of one type, the accompanying data is used as is for estimation.

Next, the accompanying data estimation unit 2108 performs step S505. Since the accompanying data used for estimation is fixed, the accompanying data estimation unit 2108 performs step S515. If, for example, the accompanying data item with the largest sum of probabilities of existence is used as the accompanying data, then the accompanying data for 2001 is used, since the sum of probabilities of existence is the highest for 2001, namely 55%.

If, on the other hand, timer periods with a sum of probabilities of existence of at least 50% are used as the accompanying data, then 2001 and 2009-2010 are used as the accompanying data, since the sum of probabilities of existence is at least 50% for each of these time periods. Note that the threshold (in this case, 50%) may be a predetermined value or a user-set value.

The time periods may also be used as a range. In this case, the range from 2001 to 2010 is used as the accompanying data. Furthermore, if the dictionary object 2-1 and the dictionary object 2-2 are different objects, and the OBJ20 is assumed to match only one of these objects, then instead of simply summing the probabilities of existence in the accompanying data items of the three types of dictionary objects, the sum of the probabilities of existence in the accompanying data items of dictionary object 1-1 and of dictionary object 2-1 may be calculated separately from the sum of the probabilities of existence in the accompanying data items of dictionary object 1-1 and of dictionary object 2-2. The time period 2001, which has the highest sum of probabilities of existence, may then be used as the accompanying data.

Furthermore, it is possible to estimate accompanying data using a plurality of types of dictionary data. In this case, processing is similar to the processing in FIG. 9 of Embodiment 1, apart from use of accompanying data of dictionary objects as the accompanying data for selection and estimation, and use of probability of existence as the method combining accompanying data during estimation, as shown in the example in FIG. 19. Therefore, a description of such processing is omitted.

2.5 Summary

As described above, the information processing device 2000 in the present embodiment can estimate accompanying data for input content groups using dictionary data.

3. Embodiment 3

The following describes the internal structure of an information processing device in Embodiment 3 of the present invention.

3.1 Structure

Accompanying data for contents targeted for estimation is estimated based on accompanying data associated with stored contents in Embodiment 1 and based on dictionary data in Embodiment 2. In Embodiment 3, on the other hand, accompanying data for contents targeted for estimation is estimated based on data for age estimation.

The following describes the structure of the information processing device 3000 in the present embodiment. Note that the same reference signs are provided for constituent elements having the same function as in the information processing device 10 of Embodiment 1.

The information processing device 3000 includes a content storage unit 3101, a content group selection unit 102, a database 3103, an object selection unit 104, a content analysis unit 105, an age estimation object specification unit 3106, an accompanying data extraction unit 3107, an accompanying data estimation unit 3108, an accompanying data writing unit 109, and a receiving unit 110.

(1) Database 3103

Figure 21:
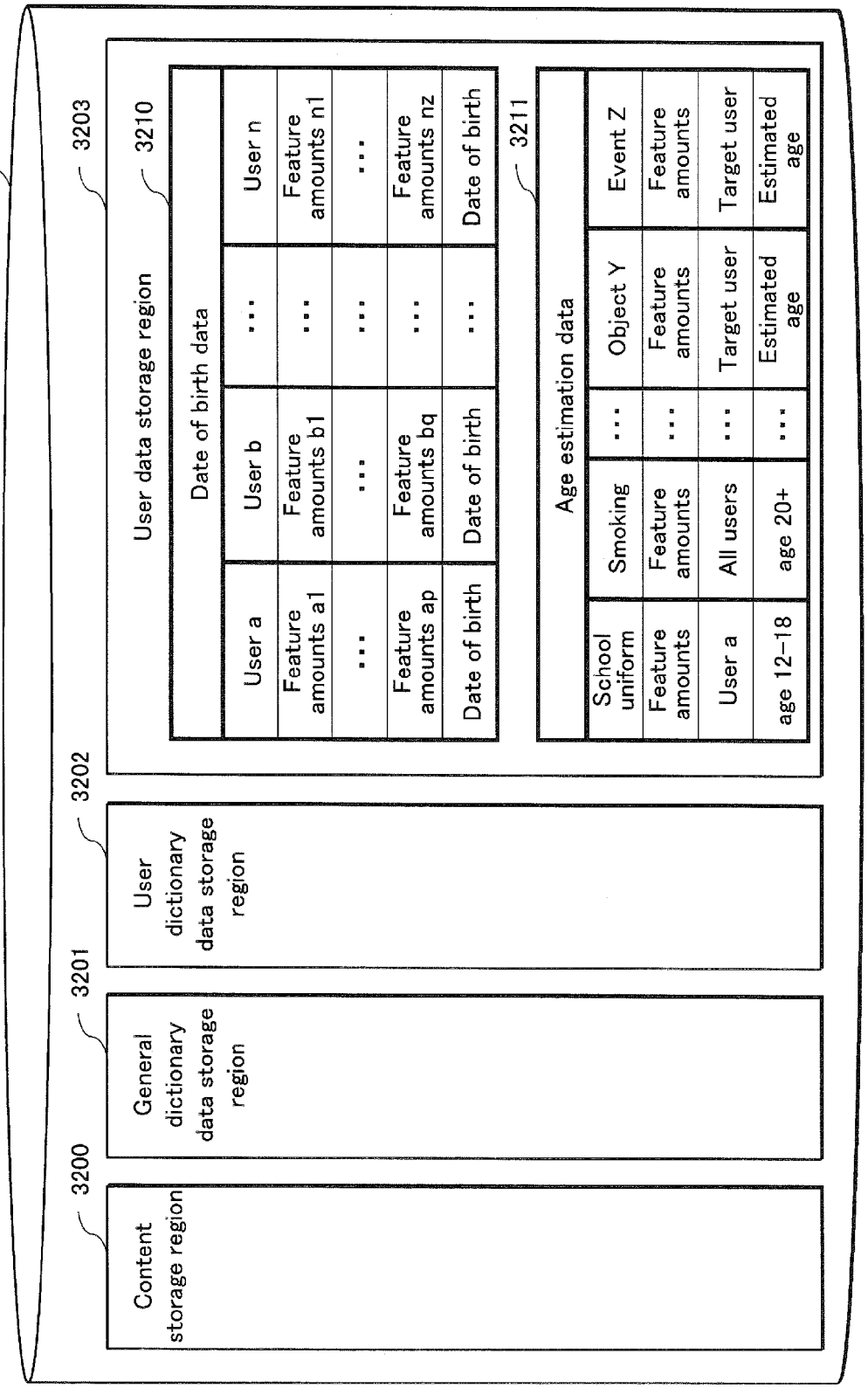
FIG. 21 shows an example of the data structure of a database 3103.

As shown in FIG. 21, the database 3103 includes a content storage region 3200 and a user data storage region 3203.

The content storage region 3200 stores stored contents and contents targeted for estimation, as in Embodiment 1. Since the stored contents and the contents targeted for estimation have been described in Embodiment 1, a description thereof is omitted here.

The general dictionary data storage region 3201 and the user dictionary data storage region 3202 respectively store general dictionary data and user dictionary data, as in Embodiment 2. Note that the general dictionary data and the user dictionary data have already been described in Embodiment 2. Further description is thus omitted here.

As shown in FIG. 21, the user data storage region 3203 stores date of birth data 3210 and age estimation data 3211.

The date of birth data 3210 associates one or more feature amounts and a date of birth with each of a plurality of users (in this example, user a, user b, ..., user n). The date of birth data 3210 is used to specify a subject included in a content and the age of the subject.

The age estimation data 3211 associates accompanying data (feature amounts, corresponding user(s), and estimated age of user) with each object or event for estimating the age of an object included in a content targeted for estimation. Hereinafter, an object or event for estimating age is referred to as an age estimation object. Each accompanying data item is also used to identify the corresponding object or event.

Objects or events by which age can be estimated include, for example, "school uniform" or "smoking". School uniforms can be used to estimate age since typically a user wearing a school uniform would be junior high or high school age. Smoking can also be used to estimate the age of a user, since minors are not allowed to smoke in Japan. Objects or events may also be based on a user's particular circumstances.

Note that age estimation objects are not limited to these examples. Any sort of object or event that allows for estimation of a user's age is possible.

(2) Content Storage Unit 3101

The content storage unit 3101 stores and manages the stored contents, the contents targeted for estimation, the general dictionary data, the user dictionary data, the date of birth data, and the age estimation data in the database 3103.

(3) Age Estimation Object Specification Unit 3106

For each input object, the age estimation object specification unit 3106 uses the date of birth data 3210 to specify a user similar to the input object, while also extracting one or more age estimation objects similar to the input object from among age estimation objects included in the age estimation data 3211.

Specifically, the age estimation object specification unit 3106 specifies a user similar to the input object based on feature amounts of the input object calculated by the content analysis unit 105 and one or more feature amounts of users included in the date of birth data 3210.

The age estimation object specification unit 3106 extracts one or more age estimation objects that correspond to the accompanying data that includes the specified user and that are similar to the input object. Specifically, the age estimation object specification unit 3106 first acquires one or more age estimation objects that are similar to the input object based on feature amounts of the input object calculated by the content analysis unit 105 and feature amounts included in the age estimation data. The age estimation object specification unit 3106 then acquires, from among the one or more extracted age estimation objects, all of the age estimation objects whose accompanying data includes the user specified as being similar to the input object.

Stating that an age estimation object is similar to an input object means that the feature amounts of the input object and the feature amounts of the age estimation object either match or differ within an allowable range. A predetermined value or a user-set value may be used as the allowable range.

The concept of including a particular user in accompanying data refers to information on users in the accompanying data (user information) matching the specified user, or to the user information explicitly including the specified user.

(4) Accompanying Data Extraction Unit 3107

The accompanying data extraction unit 3107 extracts an estimated age corresponding to the acquired age estimation object.

(5) Accompanying Data Estimation Unit 3108

The accompanying data estimation unit 3108 uses the date of birth corresponding to the user specified by the age estimation object specification unit 3106 and the accompanying data of the age estimation object extracted by the accompanying data extraction unit 3107 in order to estimate the time period of the input content group.

3.2 Operations (1) Outline of Operations

The following describes an outline of operations by the information processing device 3000 with reference to the flowchart in FIG. 22.

The content group selection unit 102 classifies one or more contents targeted for estimation into one or more input content groups based on user operation (step S600).

The object selection unit 104 selects one or more input objects for each content targeted for estimation included in each input content group (step S605). Specifically, as in Embodiment 1, the object selection unit 104 receives a designation, provided by user operation, of a region that includes an object in the content targeted for estimation. Upon receiving the designation, the object selection unit 104 selects the designated region as an input object.

The content analysis unit 105 calculates feature amounts for each of the one or more input objects selected by the object selection unit 104 (step S610).

For each of the input objects extracted in step S605, the age estimation object specification unit 3106 performs age estimation object acquisition processing in order to specify a user similar to the input object and to acquire one or more age estimation object (step S615).

For each of the one or more age estimation objects extracted in step S615, the accompanying data extraction unit 3107 extracts an estimated age for the age estimation object (step S620).

The accompanying data estimation unit 2108 estimates the time period for each input content group (step S625).

For each input content group, the accompanying data writing unit 109 records the time period estimated in step S625 as the accompanying data for all of the contents targeted for estimation included in the input content group (step S630).

(2) Classification

The classification shown in step S600 of FIG. 22 can be achieved by similar operations as in the flowchart of FIG. 4. A description of the classification is thus omitted here.

(3) Age Estimation Object Extraction

Figure 23:
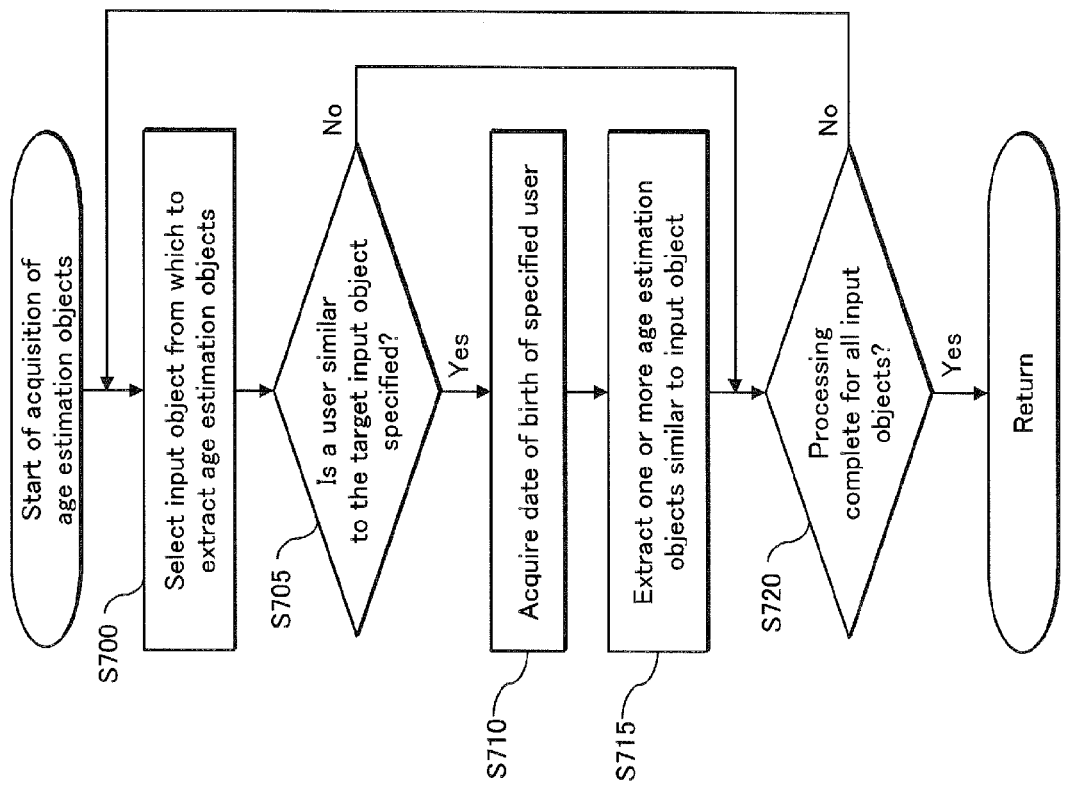
FIG. 23 is a flowchart showing operations for age estimation object acquisition.

The following describes operations for age estimation object extraction shown in step S615 of FIG. 22 with reference to the flowchart in FIG. 23.

From among the input objects extracted in step S605, the age estimation object specification unit 3106 selects an input object in which to search for age estimation objects (step S700).

The age estimation object specification unit 3106 determines whether a user has been specified as similar to the selected input object based on the feature amounts of the input object and the feature amounts of user a, . . . , user n included in the date of birth data (step S705).

If a user has been specified (step S705: Yes), the age estimation object specification unit 3106 acquires the date of birth associated with the specified user (step S710). Furthermore, the age estimation object specification unit 3106 extracts one or more age estimation objects similar to the selected input object (step S715).

The age estimation object specification unit 3106 then determines whether extraction of age estimation objects is complete for all of the input objects extracted in step S605 (step S720).

If extraction is determined not to be complete (step S720: No), processing returns to step S700. If extraction is determined to be complete (step S720: Yes), processing terminates.

Furthermore, if it is determined that no user has been specified as similar to the selected input object (step S705: No), processing proceeds to step S720.

(4) Time Period Estimation

Figure 24:
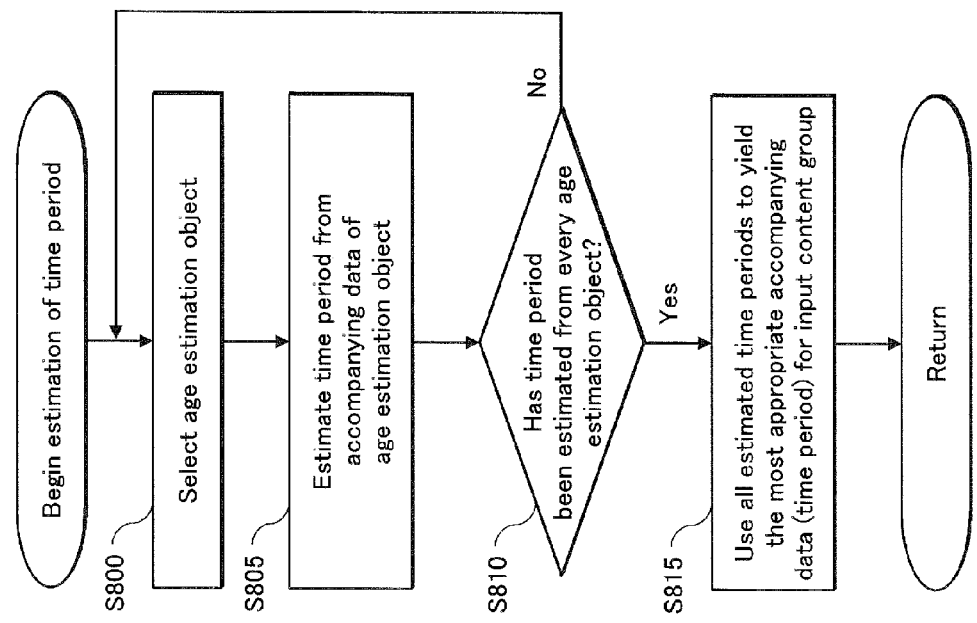
FIG. 24 is a flowchart showing operations for time period estimation.

The following describes the estimation of accompanying data in step S625 of FIG. 22 in detail with reference to the flowchart in FIG. 24. Note that this estimation process is performed for each content targeted for estimation.

The accompanying data estimation unit 3108 selects one age estimation object for age estimation of one content targeted for estimation (step S800).

The accompanying data estimation unit 3108 estimates the time period of the content targeted for estimation based on the estimated age of the age estimation object (step S805). The following describes a specific example. Note that the content targeted for estimation is assumed to include a "user a wearing a school uniform" as an input object. In this case, the accompanying data estimation unit 3108 selects "school uniform" as the age estimation object in step S800. Based on the estimated age for this age estimation object, 12-18 years old, and the date of birth of user a (for example, Jun. 13, 1976), the time period for the input object is estimated to be "1988-1994".

The accompanying data estimation unit 3108 determines whether the time period has been estimated for every input object included in the content targeted for estimation (step S810).

If the time period has not been estimated for every input object (step S810), processing returns to step S800.

If the time period has been estimated for every input object (step S810: Yes), the accompanying data estimation unit 3108 combines the estimated time periods to yield the most appropriate time period for the input content group as the accompanying data (step S815).

3.3 Modifications

Other than the above embodiment, the present invention includes, for example, the following modifications.

(1) In the above embodiment, when extracting age estimation objects similar to an input object, the age estimation object specification unit 3106 compares the feature amounts of the input object with every age estimation object included in the age estimation data 3211. Comparison is not, however, limited in this way.

For example, the age estimation object specification unit 3106 may perform the comparison only on age estimation objects that include an indication, in the accompanying data, that the feature amounts are to be compared.

The age estimation object specification unit 3106 may acquire, age estimation objects that are similar to an input object from among all of the age estimation objects whose accompanying data includes a specified user.

Note that the method of selecting age estimation objects for the comparison of feature amounts is not limited to these methods.

(2) The function to estimate accompanying data using dictionary data as described in Embodiment 2 may be added to the above embodiment.

Furthermore, the estimation functions of Embodiments 1 and 2 and of the present embodiment may be combined for a comprehensive estimation of the most appropriate accompanying data for an input content group based on stored objects, dictionary objects, and age estimation objects.

(3) In the above embodiment, the information processing device 3000 estimates a time period in step S805 of FIG. 24, but the information processing device 3000 is not limited in this way.

For example, the information processing device 3000 may calculate time periods for combinations of users and age estimation objects in advance based on the date of birth data and the age estimation data and store the calculated time periods in the database 3103 in association with the combinations of users and age estimation objects.

When time periods are calculated in advance as described above, information on the time period associated with each combination of a user and an age estimation object may be stored in the database 3103 as user dictionary data, as described in Embodiment 2. The age estimation object may then be used as a portion of the dictionary object.

(4) In the above embodiment, the method of estimating the time period uses the date of birth data 3210 and the age estimation data 3211, but the method is not limited in this way.

For example, the date of birth of each user from user a to user n may be stored in the database 3103 in association with feature amounts for the user's face at different ages. In this case, the age estimation object specification unit 3106 can acquire an age estimation object (here, a user's face) similar to an input object by comparing the feature amounts of the input object with the feature amounts of a user at the different ages.

Furthermore, instead of storing feature amounts for the user's face at different ages, feature amounts for the user's face during different time frames, such as the user's face at age 10-19, at age 20-29, etc. may be stored in association with the date of birth.

3.4 Summary

As described above, the information processing device 3000 of the present embodiment can estimate accompanying data (in this example, a time period) for input content groups.

4. Modifications

The present invention has been described through the above embodiments, but the present invention is in no way limited to these embodiments. For example, the following modifications are possible.

(1) A program listing steps for the methods described in the above embodiments may be stored in a memory. A Central Processing Unit (CPU) or the like may read the programs from memory and execute the read programs in order to achieve the above methods.

The program listing the steps for the above methods may also be stored on a recording medium and distributed.

(2) Each structure in the above embodiments may be implemented as a Large Scale Integration (LSI), which is a type of integrated circuit. These structures may respectively be made into discrete chips, or part or all of the structures may be made into one chip. Although referred to here as an LSI, depending on the degree of integration, the terms Integrated Circuit (IC), system LSI, super LSI, or ultra LSI are also used. Furthermore, the method of integration is not limited to LSI. Integration may be achieved via a dedicated circuit or a general-purpose processor. Alternatively, a Field Programmable Gate Array (FPGA), which is an LSI that can be programmed after manufacture, or a reconfigurable processor, which is an LSI whose connections between internal circuit cells and settings for each circuit cell can be reconfigured, may be used. Furthermore, calculation by these functional blocks may be performed using, for example, a Digital Signal Processor (DSP) or CPU. These processing steps may be recorded on a recording medium as a program and executed in order to perform the above processing.

Additionally, if technology for integrated circuits that replaces LSIs emerges, owing to advances in semiconductor technology or to another derivative technology, the integration of functional blocks may naturally be accomplished using such technology. The application of biotechnology or the like is possible.

(3) The above embodiments and modifications may be combined with one another.

5. Supplementary Explanation (1) An aspect of the present invention is an information processing device comprising: a first acquisition unit operable to acquire a plurality of contents; a second acquisition unit operable to acquire one or more characteristics of each acquired content and to search among a plurality of reference data items in order to acquire one or more reference data items that each include any of the one or more characteristics, each reference data item having attached thereto at least one attribute used for identifying the reference data item, the reference data items being data other than the plurality of contents; a specification unit operable to specify, among the attributes attached to the acquired one or more reference data items, an attribute that also pertains to the plurality of contents, the specified attribute being used for identifying each of the plurality of contents; and an attachment unit operable to attach the specified attribute to each of the plurality of contents.

With the above structure, the information processing device uses the attributes attached to the reference data items to specify a shared attribute that is to be used to identify the plurality of contents and attaches the specified attribute to each of the plurality of contents. Therefore, the information processing device can attach a shared attribute to a content group composed of a plurality of contents. By attaching the shared attribute to each of the plurality of contents, the information processing device can, for example, search the content group using the attached attribute as a keyword for searching.

(2) The plurality of contents may be shot images and each include at least one object, each reference data item may include at least one object identified by the attribute attached to the reference data item, the second acquisition unit may acquire, as the one or more characteristics of each acquired content, one or more objects included in each of the contents and acquire, for each acquired object, one or more similar objects that are similar to the acquired object by searching among the objects included by the plurality of reference data items, and the specification unit may acquire, for each of the one or more similar objects, the attribute that identifies the object and is attached to the reference data item that includes the object.

With this structure, the information processing device can use, as the characteristics, the attributes attached to objects that are the same as or similar to the acquired object. This allows for easy specification of the shared attribute that is to be used to identify the plurality of contents.

(3) Each reference data item may be an image that includes at least one object identified by the attribute attached to the reference data item.

With this structure, when attaching an attribute to the plurality of contents (images), the information processing device uses images (reference data items) to which attributes are already attached. By attaching the attribute to the plurality of contents, the contents can also be used as reference data items.

(4) Each object included in each reference data item may be associated with a degree of reliability used in object identification, and when two or more objects are targeted for acquisition from a same reference data item, the second acquisition unit may acquire the object associated with a highest degree of reliability.

With this structure, the information processing device acquires the object with the highest degree of reliability. The attribute attached to the plurality of contents therefore also has a high degree of reliability with respect to the plurality of contents.

(5) Each reference data item may be a shot image, the attribute attached to each reference data item may indicate a shooting location, and based on the shooting locations indicated by the attributes acquired from the reference data items, the specification unit may organize the attributes into groups each of a predetermined range and specify the group containing a greatest number of attributes, the range indicated by the specified group being the specified attribute used for identifying the plurality of contents.

With this structure, the information processing device uses attributes that indicate shooting location. The information processing device can therefore attach an attribute indicating a shared location to the plurality of contents.

(6) Each reference data item may be a shot image, the attribute attached to each reference data item may indicate a shooting date and time, and based on the shooting dates and times indicated by the attributes acquired from the reference data items, the specification unit may organize the attributes into groups each of a predetermined time frame and specify the group containing a greatest number of attributes, the time frame of the specified group being the specified attribute used for identifying the plurality of contents.

With this structure, the information processing device uses attributes that indicate a shooting date and time. The information processing device can therefore attach an attribute indicating a shared time frame to the plurality of contents.

(7) Each reference data item may be a shot image, the attribute attached to each reference data item may be a keyword containing a description of the reference data item, and the specification unit may specify the number of occurrences of a same or equivalent keyword in the keywords indicated by the attributes acquired from the reference identifiers, and when the specified number of occurrences equals at least a predetermined number, use the keyword with at least the predetermined number of occurrences as the specified attribute used for identifying the plurality of contents.

With this structure, the information processing device uses a keyword containing a description of the content as the attribute. The information processing device can therefore attach a shared keyword to the plurality of contents as the attribute.

(8) The plurality of reference data items may constitute dictionary data, and for each acquired object in each content acquired by the first acquisition unit, the second acquisition unit may acquire the one or more similar objects by searching among the dictionary data.

With this structure, the information processing device uses dictionary data and can therefore easily acquire objects.

(9) The information processing device may further comprise a user information storage unit storing user information pertaining to a user, wherein the second acquisition unit acquires, for each acquired object in each content acquired by the first acquisition unit, the one or more similar objects in association with the user, and the specification unit acquires, for each of the one or more similar objects, the attribute that identifies the object and is attached to the reference data item that includes the object, and specifies, using each acquired attribute and the user information, a time period in which each of the plurality of contents was shot, the specified time period being the specified attribute for each of the plurality of contents.

With this structure, the information processing device specifies a time period for the plurality of contents based on user information and attributes of objects related to the user. The information processing device can therefore acquire an appropriate time period for the plurality of contents.

(10) The user information may be a date of birth of the user, the attribute may indicate an age range of the user, the object included in each reference data item may be a face of the user estimated to correspond to the age range indicated by the attribute attached to the reference data item, and the specification unit may specify, using the age range indicated by each acquired attribute and the date of birth of the user, a time period in which each of the plurality of contents was shot.

With this structure, the information processing device uses the date of birth of the user as the user information. The information processing device can therefore easily specify an appropriate time period for the plurality of contents.

INDUSTRIAL APPLICABILITY

The information processing device according to the present invention estimates and attaches the most appropriate attribute to a plurality of contents forming an input content group and allows for management and effective use of the contents based on the attached attribute. Furthermore, the information processing device according to the present invention can also recommend a content related to another content.

REFERENCE SIGNS LIST 10 information processing device
101 content storage unit
102 content group selection unit
103 database
104 object selection unit
105 content analysis unit
106 similar object specification unit
107 accompanying data extraction unit
108 accompanying data estimation unit
109 accompanying data writing unit
110 receiving unit

The invention claimed is:

1. An information processing device comprising:
a first acquisition unit operable to acquire a plurality of contents;
a second acquisition unit operable to acquire one or more characteristics of each acquired content and to search among a plurality of reference data items in order to acquire one or more reference data items that each include any of the one or more characteristics, each reference data item having attached thereto at least one attribute used for identifying the reference data item, the reference data items being data other than the plurality of contents;
a specification unit operable to specify, among attributes attached to the acquired one or more reference data items, an attribute that also pertains to the plurality of contents, the specified attribute being used for identifying each of the plurality of contents; and
an attachment unit operable to attach the specified attribute to each of the plurality of contents, wherein
the plurality of contents are shot images and each include at least one object,
each reference data item includes at least one object identified by the attribute attached to the reference data item,
the second acquisition unit
acquires, as the one or more characteristics of each acquired content, one or more objects included in each of the contents, and
acquires, for each acquired object, one or more similar objects that are similar to the acquired object by searching among the objects included by the plurality of reference data items,
the specification unit acquires, for each of the one or more similar objects, the attribute that identifies the object and is attached to the reference data item that includes the object,
each reference data item is a shot image that includes at least one object identified by the attribute attached to the reference data item,
the attribute attached to each reference data item indicates a shooting location, and
based on the shooting locations indicated by the attributes acquired from the reference data items, the specification unit organizes the attributes into groups each of a predetermined range and specifies the group containing a greatest number of attributes, the range indicated by the specified group being the specified attribute used for identifying the plurality of contents.

2. The information processing device of claim 1, wherein each object included in each reference data item is associated with a degree of reliability used in object identification, and
when two or more objects are targeted for acquisition from a same reference data item, the second acquisition unit acquires the object associated with a highest degree of reliability.

3. The information processing device of claim 1, wherein the attribute attached to each reference data item further indicates a shooting date and time, and
based on the shooting dates and times indicated by the attributes acquired from the reference data items, the specification unit further organizes the attributes into groups each of a predetermined time frame and specifies the group containing a greatest number of attributes, the time frame of the specified group being the specified attribute used for identifying the plurality of contents.

4. The information processing device of claim 1, wherein the attribute attached to each reference data item further indicates a keyword containing a description of the reference data item, and
the specification unit further specifies the number of occurrences of a same or equivalent keyword in the keywords indicated by the attributes acquired from the reference identifiers, and when the specified number of occurrences equals at least a predetermined number, uses the keyword with at least the predetermined number of occurrences as the specified attribute used for identifying the plurality of contents.

5. The information processing device of claim 1, wherein the plurality of reference data items constitute dictionary data, and
for each acquired object in each content acquired by the first acquisition unit, the second acquisition unit acquires the one or more similar objects by searching among the dictionary data.

6. The information processing device of claim 1, further comprising:
a user information storage unit storing user information pertaining to a user, wherein
the second acquisition unit acquires, for each acquired object in each content acquired by the first acquisition unit, the one or more similar objects in association with the user, and
the specification unit
acquires, for each of the one or more similar objects, the attribute that is attached to the reference data item that includes the object, and
specifies, using each acquired attribute and the user information, a time period in which each of the plurality of contents was shot, the specified time period being the specified attribute for each of the plurality of contents.

7. The information processing device of claim 6, wherein the user information is a date of birth of the user,
the attribute attached to each reference data item further indicates an age range of the user, the object included in each reference data item is a face of the user estimated to correspond to the age range indicated by the attribute attached to the reference data item, and the specification unit further specifies, using the age range indicated by each acquired attribute and the date of birth of the user, a time period in which each of the plurality of contents was shot.

8. A processing method used in an information processing device, comprising the steps of:

acquiring a plurality of contents;

acquiring one or more characteristics of each acquired content and searching among a plurality of reference data items in order to acquire one or more reference data items that each include any of the one or more characteristics, each reference data item having attached thereto at least one attribute used for identifying the reference data item, the reference data items being data other than the plurality of contents;

specifying, among the attributes attached to the acquired one or more reference data items, an attribute that also pertains to the plurality of contents, the specified attribute being used for identifying each of the plurality of contents; and attaching the specified attribute to each of the plurality of contents, wherein the plurality of contents are shot images and each include at least one object, each reference data item includes at least one object identified by the attribute attached to the reference data item, said step of acquiring one or more characteristics of each acquired content further comprises (i) acquiring, as the one or more characteristics of each acquired content, one or more objects included in each of the contents, and (ii) acquiring, for each acquired object, one or more similar objects that are similar to the acquired object by searching among the objects included by the plurality of reference data items, said step of specifying further comprises acquiring, for each of the one or more similar objects, the attribute that identifies the object and is attached to the reference data item that includes the object, each reference data item is a shot image that includes at least one object identified by the attribute attached to the reference data item, the attribute attached to each reference data item indicates a shooting location, and based on the shooting locations indicated by the attributes acquired from the reference data items, said step of specifying further comprises organizing the attributes into groups each of a predetermined range and specifying the group containing a greatest number of attributes, the range indicated by the specified group being the specified attribute used for identifying the plurality of contents.

9. A non-transitory computer-readable medium having a computer program stored thereon, the program being used in an information processing device, and causing a computer to perform the steps of:

acquiring a plurality of contents;

acquiring one or more characteristics of each acquired content and searching among a plurality of reference data items in order to acquire one or more reference data items that each include any of the one or more characteristics, each reference data item having attached thereto at least one attribute used for identifying the reference data item, the reference data items being data other than the plurality of contents;

specifying, among the attributes attached to the acquired one or more reference data items, an attribute that also pertains to the plurality of contents, the specified attribute being used for identifying each of the plurality of contents; and attaching the specified attribute to each of the plurality of contents, wherein the plurality of contents are shot images and each include at least one object, each reference data item includes at least one object identified by the attribute attached to the reference data item, said step of acquiring one or more characteristics of each acquired content further comprises (i) acquiring, as the one or more characteristics of each acquired content, one or more objects included in each of the contents, and (ii) acquiring, for each acquired object, one or more similar objects that are similar to the acquired object by searching among the objects included by the plurality of reference data items, said step of specifying further comprises acquiring, for each of the one or more similar objects, the attribute that identifies the object and is attached to the reference data item that includes the object, each reference data item is a shot image that includes at least one object identified by the attribute attached to the reference data item, the attribute attached to each reference data item indicates a shooting location, and based on the shooting locations indicated by the attributes acquired from the reference data items, said step of specifying further comprises organizing the attributes into groups each of a predetermined range and specifying the group containing a greatest number of attributes, the range indicated by the specified group being the specified attribute used for identifying the plurality of contents.

10. An integrated circuit used in an information processing device, the integrated circuit comprising:

a first acquisition unit operable to acquire a plurality of contents;

a second acquisition unit operable to acquire one or more characteristics of each acquired content and to search among a plurality of reference data items in order to acquire one or more reference data items that each include any of the one or more characteristics, each reference data item having attached thereto at least one attribute used for identifying the reference data item, the reference data items being data other than the plurality of contents;

a specification unit operable to specify, among the attributes attached to the acquired one or more reference data items, an attribute that also pertains to the plurality of contents, the specified attribute being used for identifying each of the plurality of contents; and an attachment unit operable to attach the specified attribute to each of the plurality of contents, wherein the plurality of contents are shot images and each include at least one object, each reference data item includes at least one object identified by the attribute attached to the reference data item, the second acquisition unit acquires, as the one or more characteristics of each acquired content, one or more objects included in each of the contents, and acquires, for each acquired object, one or more similar objects that are similar to the acquired object by searching among the objects included by the plurality of reference data items, the specification unit acquires, for each of the one or more similar objects, the attribute that identifies the object and is attached to the reference data item that includes the object, each reference data item is a shot image that includes at least one object identified by the attribute attached to the reference data item, the attribute attached to each reference data item indicates a shooting location, and based on the shooting locations indicated by the attributes acquired from the reference data items, the specification unit organizes the attributes into groups each of a predetermined range and specifies the group containing a greatest number of attributes, the range indicated by the specified group being the specified attribute used for identifying the plurality of contents.

* * * * *